FIG_1

April 29, 1958          H. J. CHALL          2,832,533
TOTALING MECHANISM FOR LISTING ADDING MACHINE
Original Filed Jan. 29, 1954                 9 Sheets-Sheet 2

FIG_2

April 29, 1958     H. J. CHALL     2,832,533
TOTALING MECHANISM FOR LISTING ADDING MACHINE
Original Filed Jan. 29, 1954     9 Sheets-Sheet 4

April 29, 1958 H. J. CHALL 2,832,533
TOTALING MECHANISM FOR LISTING ADDING MACHINE
Original Filed Jan. 29, 1954 9 Sheets-Sheet 5

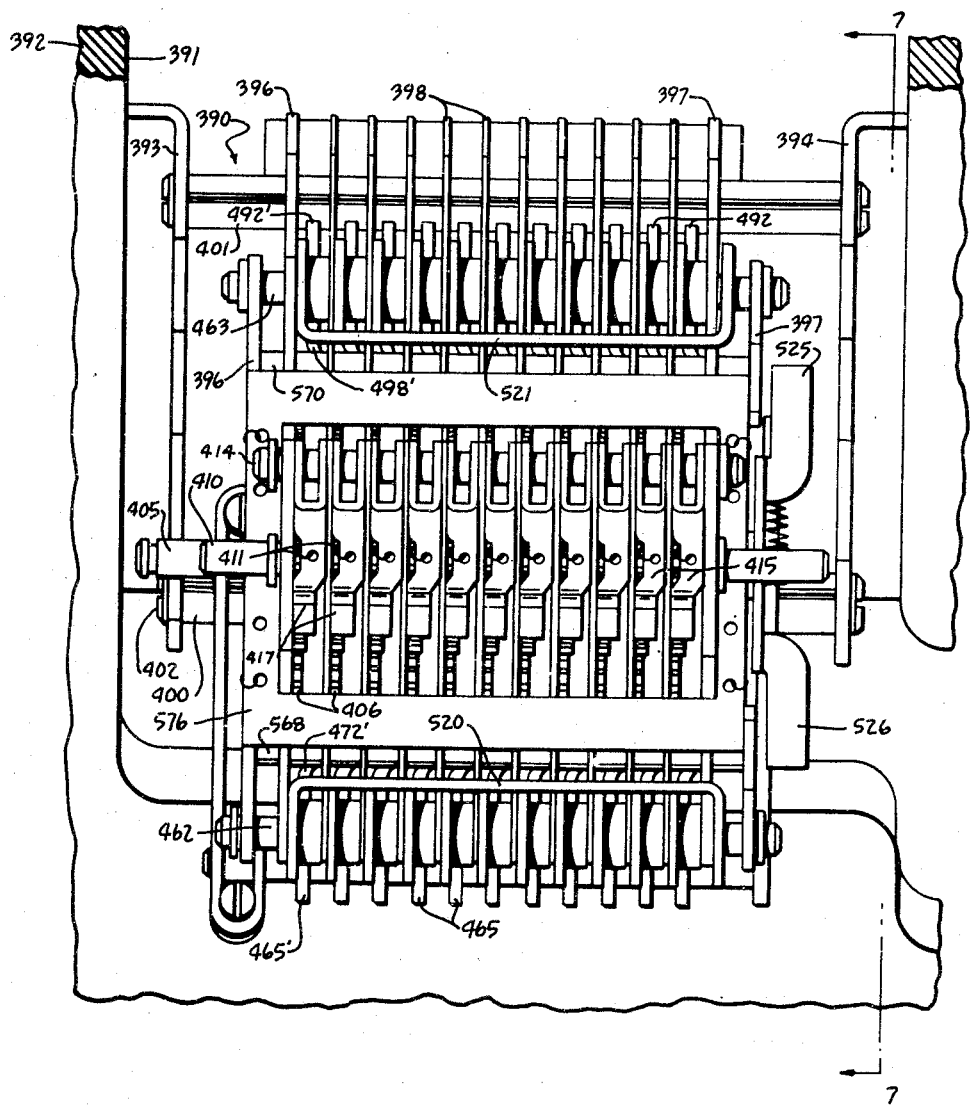
FIG_6

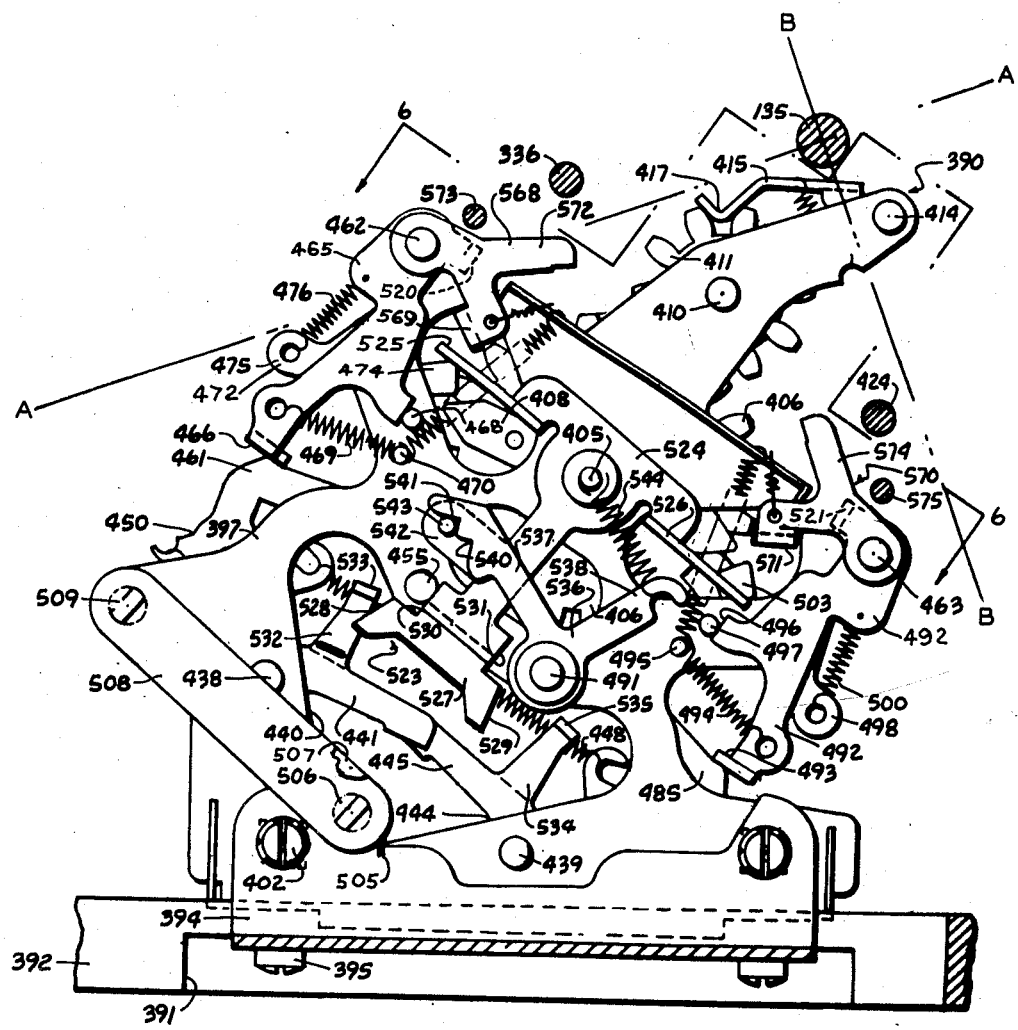
FIG_7

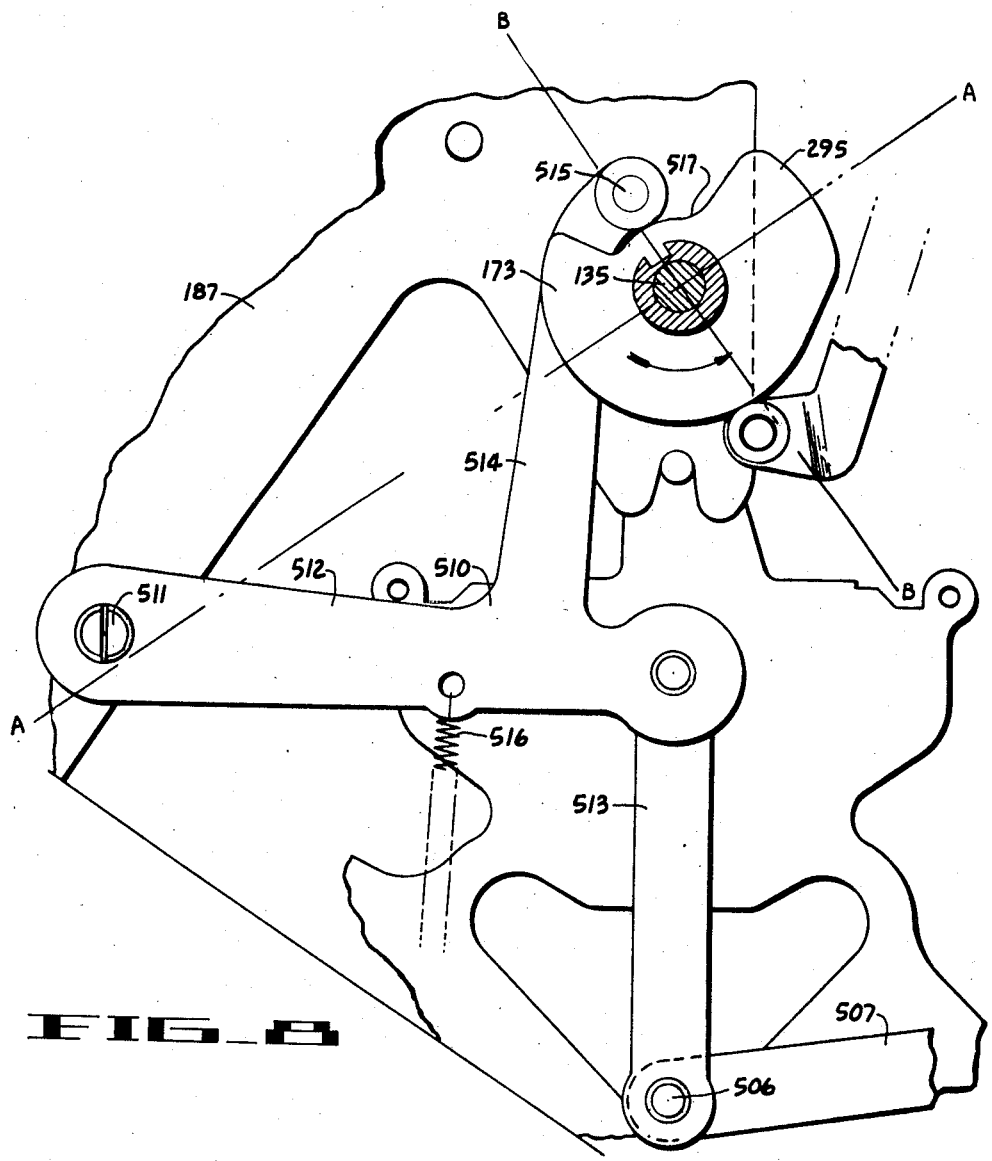

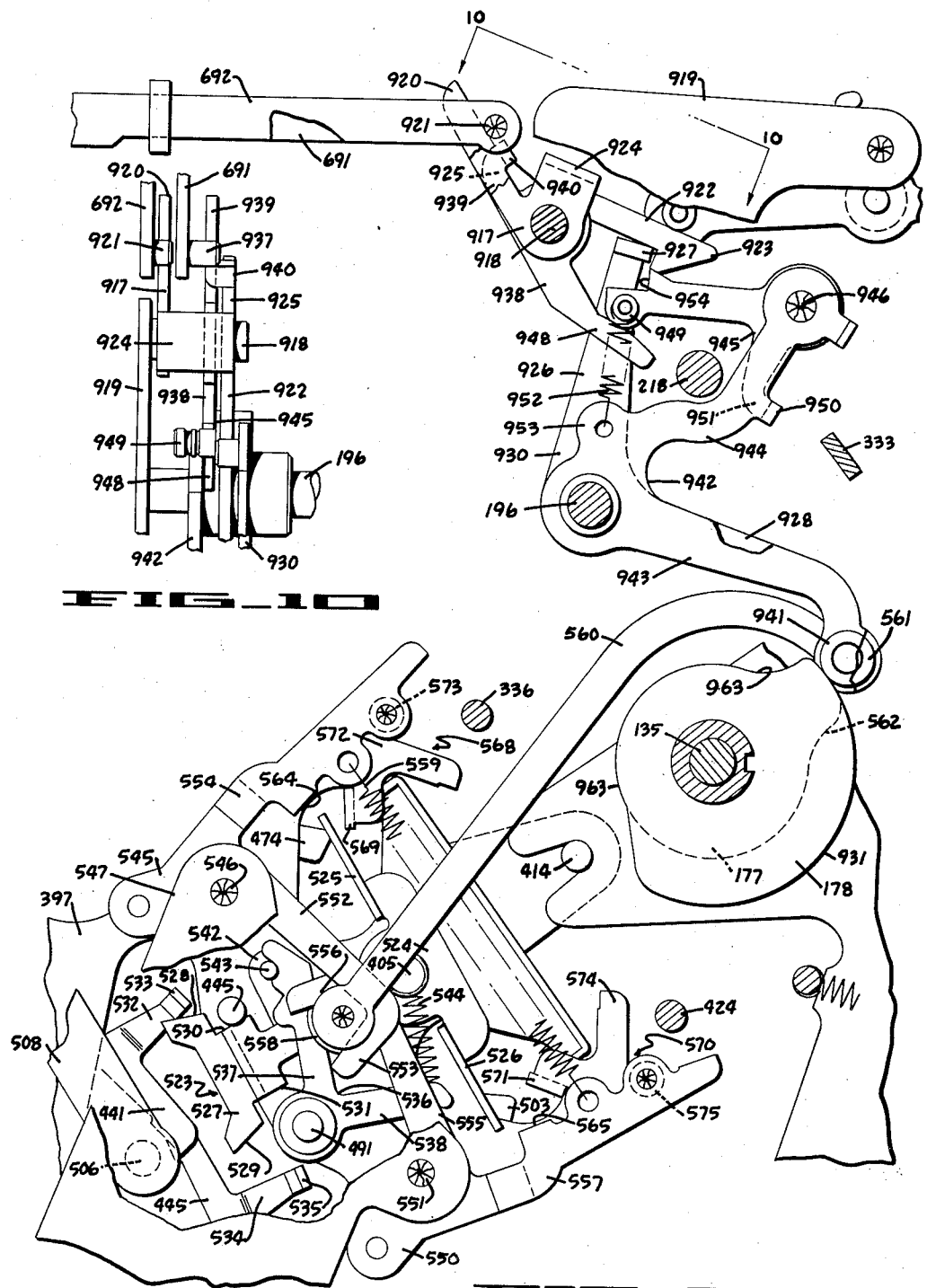

United States Patent Office 2,832,533
Patented Apr. 29, 1958

2,832,533

TOTALIZING MECHANISM FOR LISTING ADDING MACHINE

Harold J. Chall, San Leandro, Calif., assignor to Friden, Inc., a corporation of California Original application January 29, 1954, Serial No. 407,016. Divided and this application March 15, 1954, Serial No. 416,301

19 Claims. (Cl. 235—60.2)

This invention relates to accumulator and total taking mechanisms for calculating machines, and is a division of my copending application S. N. 407,016, filed January 29, 1954, for "Listing Adding Machine Mechanism," and a continuation-in-part of application S. N. 215,064, filed March 12, 1951, for "Calculating Machine," now abandoned.

It is among the objects of the present invention to provide an improved accumulator for a ten-key adding machine, which accumulator is provided with improved, spring-actuated tens-carry mechanism operative in both an additive and a subtractive direction; which is also provided with improved mechanism for adding the "fugitive 1" whenever the accumulator passes through its zero setting in either a positive or negative direction so that the accumulator will always provide a true credit balance; which will give a total or a subtotal on a single operating cycle of the machine at any time during machine operation and eliminates the necessity of providing a cycle of idle operation before a total or subtotal taking cycle; which may be constructed as a unitary device and bodily installed in, and removed from, the associated adding machine; and which is bidirectionally operative to accumulate values either additively or subtractively with a single set of accumulator gears and a single set of accumulator drive gears.

Other objects and advantages will become apparent from a consideration of the following description and the appended claims in conjunction with the accompanying drawings wherein:

Fig. 6 is a plan view on an oblique plane of the accumulator unit of the machine, such plane being indicated by the section line 6—6 of Fig. 7;

Fig. 7 is a side-elevational view of the accumulator unit looking from a plane indicated by the line 7—7 of Fig. 6;

Fig. 8 is a cross-sectional view on a plane adjacent and parallel to the section plane of Fig. 5 and shows the cam and associated mechanism for operating the bail which restores the tens-transfer mechanism of the accumulator after a tens-transfer has been completed;

Fig. 9 is a cross-sectional view on a plane adjacent and parallel to the section plane of Fig. 7 and shows the mechanism for sensing the algebraic sign of a value standing in the accumulator and for conditioning the actuator mechanism of the machine to read out the value in the accumulator either additively or substractively in accordance with the sign characteristic of the value in the accumulator for printing a total or subtotal of the value; and Fig. 10 is a fragmentary top plan view parallel to a plane indicated by the line 10—10 of Fig. 9 and shows a portion of the readout conditioning mechanism.

In Figs. 4, 5, 7 and 8 a line A—A, indicating a reference plane parallel to the keyboard of the machine, has been drawn through the axis of the cam shaft 135 of the machine. A second line B—B has been drawn through the axis of shaft 135 perpendicular to the line A—A and indicates a second reference plane perpendicularly intersecting the plane indicated by the line A—A along the axis of shaft 135.

Figure 1:
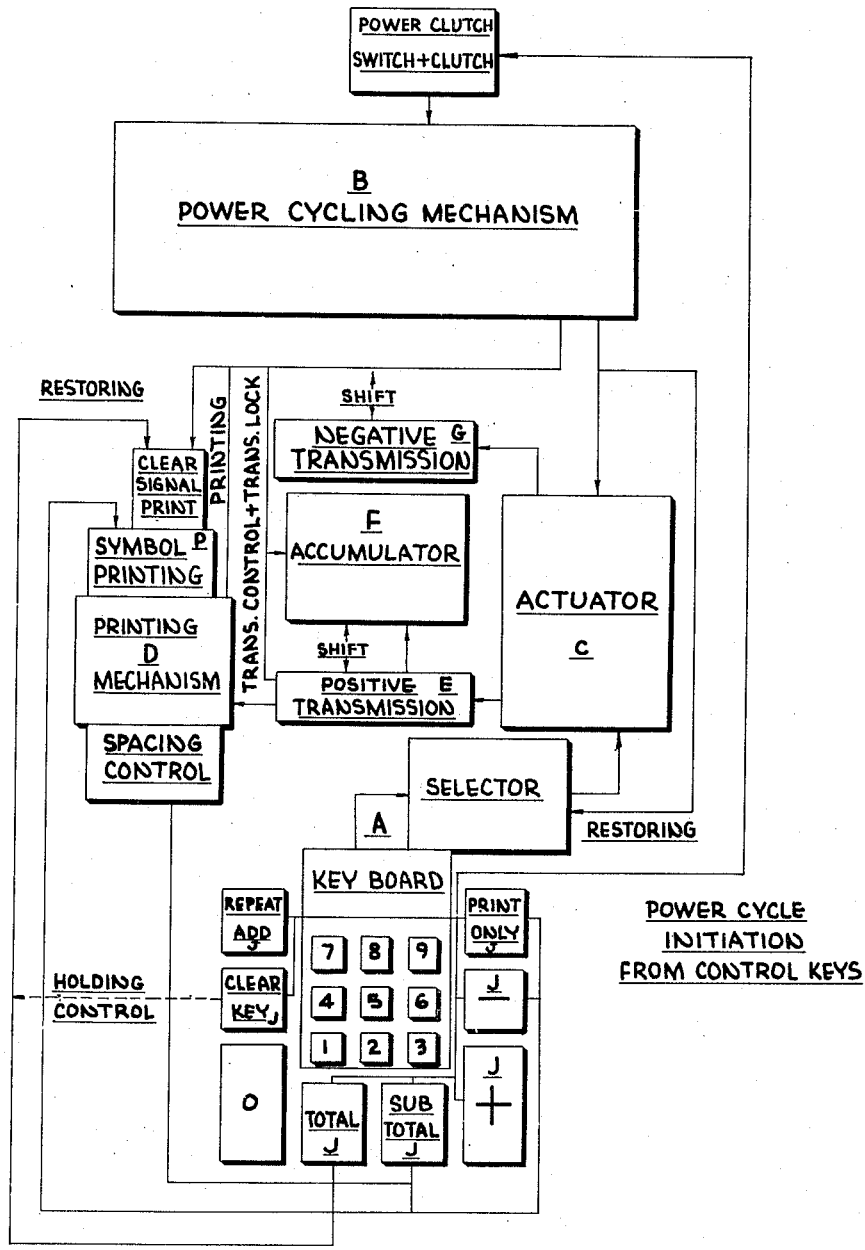
Fig. 1 is a diagrammatic illustration of the adding machine.

With continued reference to the drawings and particularly to Fig. 1, the adding machine of the present invention comprises, in addition to a suitable base, a suitable mechanism supporting framework and a mechanism cover, digitation mechanism A including a ten-key keyboard and a selection device having selector racks which are sequentially set to selected values from a higher to the lowest order corresponding to values entered therein by manual depression of selected keys of the keyboard. It also comprises a printing mechanism D, and accumulator F, a power driven actuator C controlled by the selection device, power cycling mechanism B, a positive transmission E which drivingly connects the actuator with the printing mechanism at all times and alternatively connects the actuator with the selector mechanism or the accumulator, a negative transmission G which, at times, connects the actuator to the accumulator, and a set of control keys J including an addition key, a subtraction key, a subtotal key, a total key, a print only key, a keyboard clearing key and a repeat addition key, all as diagrammatically indicated in Fig. 1.

The power cycling device includes a motor driven cam shaft carrying a plurality of mechanism actuating cams and transmission means between the motor and the cam shaft effective to turn the cam shaft through one complete rotation and bring it to a stop each time a control key of the machine is operated.

The positive and negative transmissions each have a neutral position and one transmission always occupies its neutral position while the other is in its operative position. Both are bidirectionally operative to either transmit values from the selector mechanism to the accumulator or to transmit values from the accumulator to the printing mechanism.

The selector includes a unit leaterally shiftable relative to the actuator and accumulator under control of an escapement mechanism as values are entered therein so that the digits of a value of any number of digits within the capacity of the selector are simultaneously transmitted through the actuator to the printing mechansim and the accumulator upon the operation of any one of the addition, repeat addition or subtraction control keys.

Before operation of a value transmitting control key, a value can be cleared from the selector by operation of the keyboard clearing key without printing and without changing the total in the accumulator or feeding the printing tape.

The printing mechanism includes a paper tape on which the values are printed and an ink carrying ribbon which is preferably divided longitudinally into two portions of different colors. There is a tape feeding mechanism provided with a spacing adjustment which is effective to feed the tape in single space steps while entry values are being entered into the machine and printed and when a value is printed without entry into the machine accumulator, to double space the tape feed whenever a "total" or "subtotal" value is printed to thereby clearly offset the total and subtotal figures from the following column of entry value figures on the tape, and to interrupt tape feeding when the keyboard clearing key is depressed. There is also a ribbon shift means which is effective to position the ribbon in one color position when a positive or additive quantity is printed, and in a different color position when a negative or subtractive quantity is printed and means are provided for winding the ribbon back and forth between spaced-apart ribbon spools.

The actuator includes a plurality of sectors which are power oscillated to accomplish an advance stroke and a return stroke each time a control key is operated. On the advance stroke, the actuators are moved to an extent determined by the positioning of the associated selector elements by the keyboard keys and, on the return stroke, are moved to their home, or full-cycle, position. On their advance stroke, the actuator segments transmit the selector values through the positive transmission to the printing mechanism, the printing ribbon being shifted in accordance with whether the addition or subtraction control key is operated, and on their return stroke transmit the value through either the positive or negative transmission to the accumulator in accordance with the operation of the addition or subtraction control key. The accumulator is operated in one direction by the positive transmission and in the opposite direction by the negative transmission and includes tens-transfer mechanism effective to transfer tens from any order to the next higher order in either direction of operation. The accumulator will thus accumulate both positive and negative values to a positive or negative total, as the case may be.

Because of mechanical requirements, the positive zero setting of the accumulator is spaced one unit space from the negative zero setting with the consequence that when the positive zero setting is a series of zeros, the simultaneous negative setting is a series of nines and, conversely when the accumulator has a negative zero setting, the corresponding positive setting is a series of nines. Under these conditions, if the accumulator were at its positive zero setting and a unit digit were subtractively entered, this entry would move the negative setting from a series of nines to a series of zeros giving an erroneous total of zero. Likewise, if the accumulator is at its negative zero setting and a unit digit is additively entered, the positive setting would be changed from a series of nines to a series of zeros, also giving an erroneous total. This error would always occur regardless of the value entries whenever the accumulator passed through a positive or negative zero setting following a change in its direction of operation.

This mechanical inaccuracy in the accumulator is compensated by a "fugitive 1" addition mechanism which adds a unit to the lowest order of the accumulator whenever the highest order passes through its "0" position after a change in operational direction. This addition of the "fugitive 1" when a unit digit is added to the accumulator while in its negative zero position, changes the erroneous zero total to the correct positive "1" total and, when a unit digit is subtracted from the accumulator when in its positive zero position, changes the erroneous zero total to the correct negative "1" total.

The accumulator will thus carry the true total whether the sign be positive or negative.

The accumulator also includes mechanism which senses the sign of the total value in the accumulator and conditions the associated total taking mechanism to take either a positive or a negative total.

When a total or subtotal control key is depressed, the actuator is drivingly connected with the accumulator through either the positive or negative transmission, depending on the condition of the sign sensing mechanism of the accumulator, and, upon cycling of the machine by the power cycling mechanism, reads out the total in the accumulator and transfers the total to the printing mechanism which prints it on the associated tape near the middle of the machine cycle.

When the total key is depressed, the actuator is connected to the accumulator during the advance stroke of the actuator to read out the total in the accumulator and transfer this value to the printing mechanism and is disconnected from the accumulator at the end of the advance stroke of the actuator so that the accumulator is not operated during the return stroke of the actuator but is left in its zero setting, or cleared, condition. However, when the subtotal key is operated, the actuator is maintained in driving relationship with the accumulator during both the advance stroke and the return stroke of the actuator so that the total value read out of the accumulator on the advance stroke of the actuator is returned to the accumulator on the return stroke of the actuator and further entries are added to, or subtracted from, this restored total.

The control keys are all connected to the power cycling mechanism in a manner to initiate a cycle, or rotation of the power cycling mechanism whenever a control key is operated. The power cycling mechanism is so constructed and arranged that it will automatically complete a full cycle, or rotation and come to a stop at a predetermined angular position once a cycle has been initiated by depression of a control key. Blocking means are also provided, so associated with the control keys that only one control key can be operated at a time and no other control key can be operated until after the completion of the cycle initiated by this operated key.

This precludes the possibility of forcing the machine to attempt two or more different operations at the same time and thus avoids probable errors and damage to the machine mechanism.

The machine will thus print positive and negative entries and distinguish between the positive and negative values printed, will accumulate the entry values into positive and negative totals and compensate inherent mechanical errors to provide true total values, will read out and print totals and subtotals and automatically sense the positive or negative nature of such totals, will repeat add the same value any desired number of times, will print numbers without entering such numbers into the accumulator, will clear itself whenever a total is taken but will retain its total when a subtotal is taken, will print appropriate symbols indicating the nature of the entry or the total and can be cleared of an erroneous entry before the entry is printed or accumulated.

While the digitation mechanism is similar in construction and operation to that disclosed in the Taylor Patent No. 2,628,030 and in the Frident Patents Nos. 2,371,752, patented March 20, 1945, and 2,376,997, patented May 29, 1945, it differs in several respects from these prior art devices. It differs particularly in that while the selector segments of the prior art devices are read out seriatim, in the device of the present invention the value carrying sectors are all read out simultaneously.

The selector assembly includes a cage having end plates extending longitudinally of the machine substantially perpendicular to the plane of the machine base and held in substantially parallel relationship to each other by spaced-apart tie rods extending through the cage end plates and transversely of the space therebetween. The end plates are slidably mounted on parallel guide rails which extend transversely of the machine and through apertures in the end plates, the length of the guide rails being such that the selector unit has a freedom of translational movement substantially equal to its own length transversely of the machine. The end plates support a sector mounting shaft 32 which extends transversely of the space between the end plates susbtantially parallel to the tie rods, and a pluarlity of ordinally arranged selector sectors, generally indicated at 33, are journalled on the shaft 32.

Each selector sector includes a rack element having a hub 34 mounted on the shaft 32, a toothed arcuate rim 35 spaced from the hub 34, and extending through an angle of approximately 90 degrees, and a spoke structure 36 mounting the rim 35 on the associated hub 34, and a dial element, not shown, including a hub 37 mounted on shaft 32, an arcuate rim spaced from the hub and extending through an angle of approximately 90 degrees in spaced relationship to the rack element rim 35, and a spoke structure 39 mounting the rim on the dial hub 37. The dial rim has a peripheral surface of partly cylindrical shape and has a series of numerals from "0" to "9" spaced apart therealong.

An arm 40 projects radially from the dial hub in a direction away from the dial rim and has a notched outer end disposed adjacent one side of the rack rim 35. A stud 42 projects from the rack rim 35 into the notch in the outer end of the arm 40 but has a diameter less than the width of the notch so that a limited freedom of angular movement is provement between the rack element and the dial element of each selector sector 33. The rack hub 34 has a radial projection 43 and a tension spring 44 connected between the projection 43 and the related dial spoke structure 39 resiliently urges the dial element of the seelctor sector to a limiting angular position relative to its associated rack element. The angular movement of the dial element relative to the rack element suppresses the tendency of the selector sector to rebound when its rack element encounters a pin stop or a fixed zero stop, as will be presently described.

A live pawl 45 is pivotally mounted at one end on the rack element hub extension 43 and bears adjacent its other end against the distal end of a tangential extension 46 of the rack element rim 35. A clip 47 mounted on a lateral extension 48 of the pawl 45 slidably engages the rack elements rim 35 to guide the pawl in its rocking movements about its pivotal connection with the hub extension 43 and dampen the free movement of the pawl.

The selector sector is releasably held in its full-cycle, or home, position by a latch lever 50 pivotally mounted intermediate its length on a latch shaft which extends across the space between the cage end plates and is secured at its ends to these end plates. The latch lever 50 extends longitudinally of the machine and is resiliently urged to latching position in which its rearward end engages the forwardly projecting nose 53 on the free end of the pawl 45. Each selector sector is urged to turn about shaft 32 in a clockwise direction, as viewed in Fig. 2, by a tension spring 54 which is wound partly around the sector hub and has one end connected to a sector carried ear and its other end connected to the tie rod 28. Each live pawl 45 is resiliently held against the adjacent end of the corresponding rack element rim extension 46 by a tension spring 56 connected between the live pawl and the spoke structure 36 of the corresponding rack element.

The machine cover is provided with a sight opening which is disposed just to the left of the selector unit when this unit is in its terminal right-hand, or full-cycle, position. The latch levers 50 releasably hold the selector sectors in position against the force of springs 54 such that the "0" indication near the top of the dial element rims are in alignment with the sight opening in the housing. Limit stop means for this home, or "0," position of the selector sectors is provided by engagement of an abutment formation 57 on each rack element spoke structure 36 with the tie rod 27. A limit stop for the selector sectors, when in their other limiting position, that is, when the "9" designation near the lower end of the dial rim of a sector is in alignment with the sight opening in the cover, is provided by engagement of the spoke structure 39 of the dial element with the tie rod 27. The selector sectors also have intermediate positions corresponding to the numeral designations on their dials between "0" and "9" and provided by key set stop means of well-known construction.

The machine has a rotatable cam shaft assembly including a cam shaft 135 rotatably journalled in frame members upstanding from the machine base and carrying at locations spaced apart therealong, a shiftable selector unit return cam 137, a shiftable transmission latching cam 170, a zero foil actuating cam 171 for the printing mechanism of the machine, a printing cam 172, an accumulator tens-carry operating cam 173, an actuator operating trail cam 174, an actuator operating lead cam 175, an actuator sector aligner cam 176, a subtotal cycle cam 177, a total cycle cam 178, a transmission shifting cam 179, a one rotation clutch mechanism 150 and an antibacklash cam 160.

An electric motor, not illustrated, is mounted in the rear portion of the machine and drivingly connected to the clutch 150 by a speed reducing gear train. A motor controlling switch is provided and this switch is closed and the clutch 150 conditioned to establish a single rotation operating cycle of the cam shaft assembly whenever a control key of the machine is manually depressed. The clutch and the control mechanism are so constructed and arranged that when a control key is depressed to establish an operating cycle of the machine, such control key is maintained depressed until the end of the corresponding cycle and then released and no other control key and no keyboard key can be depressed or operated while a control key is depressed.

Figure 2:
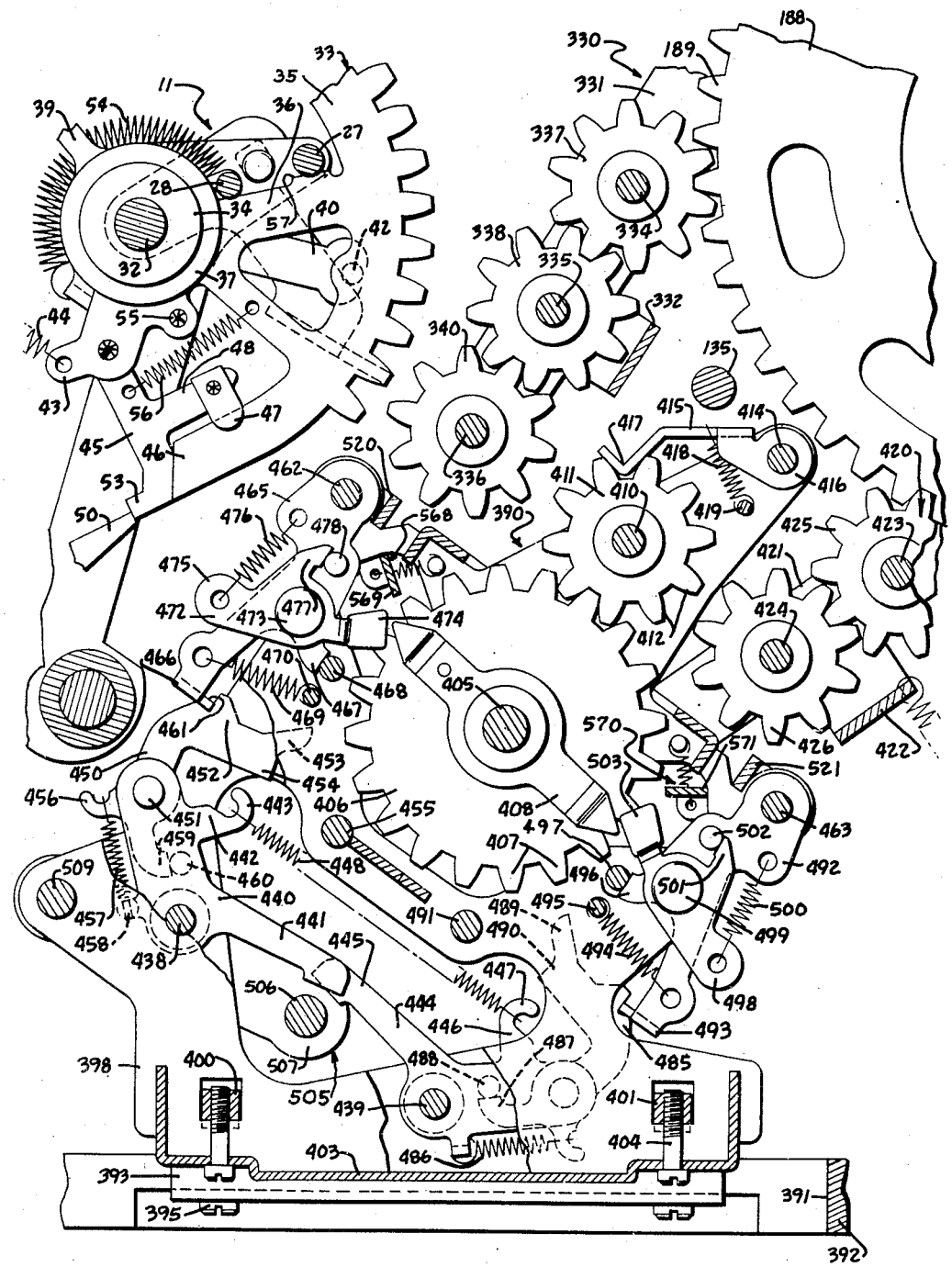
Fig. 2 is a cross-sectional view of the accumulator, the positive gear transmission mechanism, the negative gear transmission mechanism, and the immediately associated parts of the machine.
Figure 3:
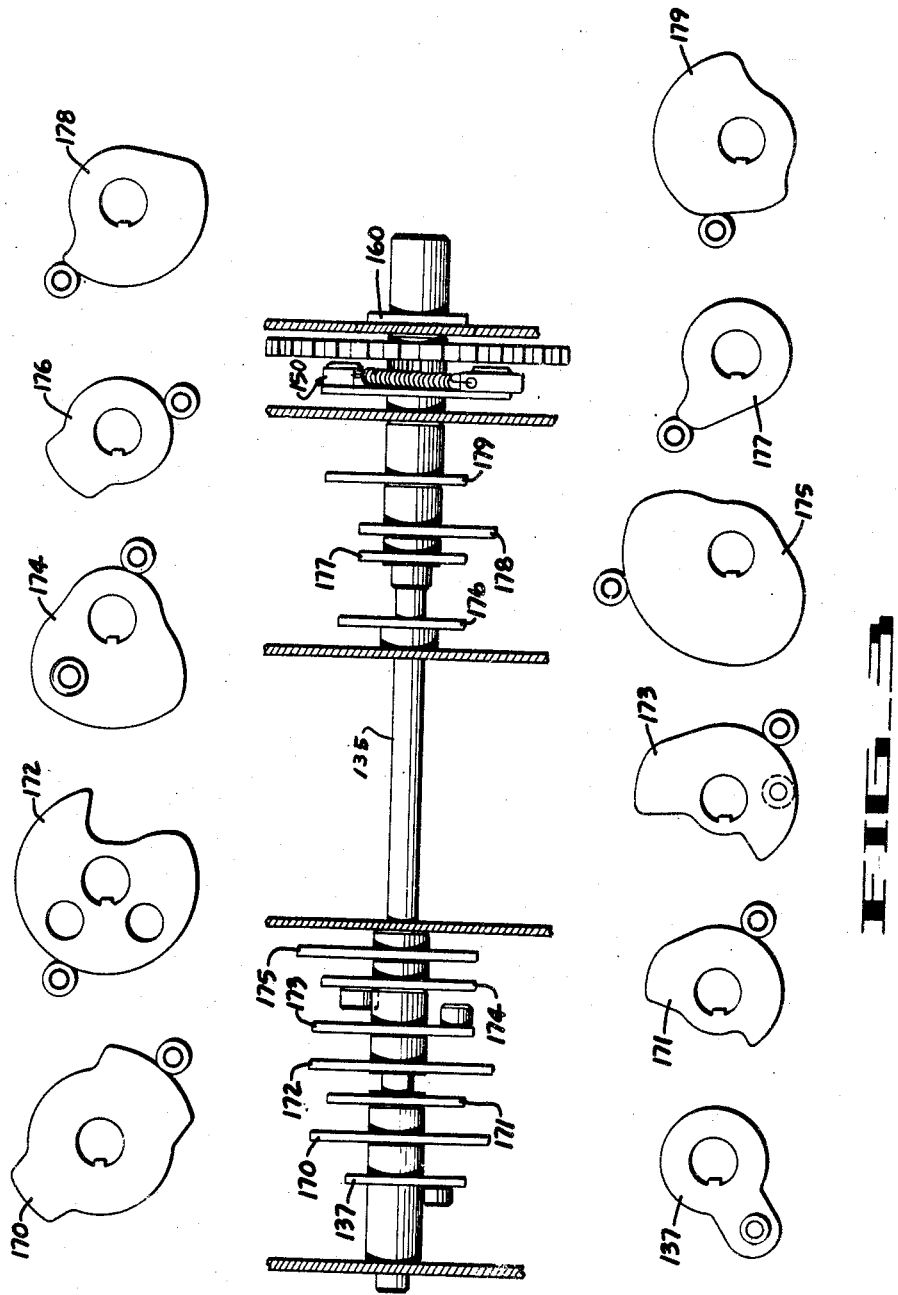
Fig. 3 is a front elevational view showing the machine cam shaft, the cams carried by the cam shaft, the location of the various cams along the cam shaft, and the form in plan view of the various cams.
Figure 4:
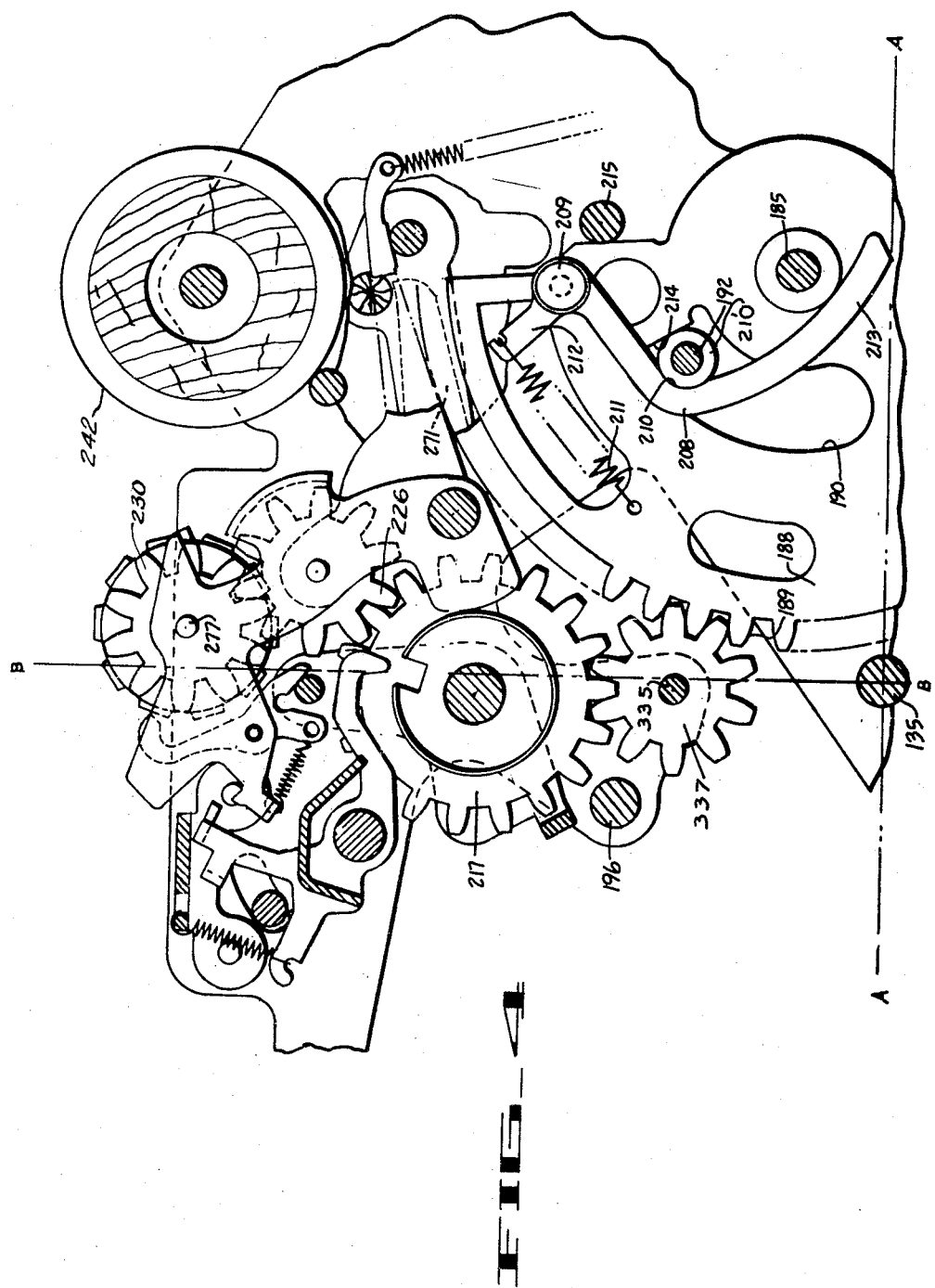
Fig. 4 is a view showing a portion of the printing mechanism and particularly the print wheels, the print wheel drive and the operating mechanism for the print wheels.

The actuator mechanism, Figs. 2 and 4, comprises an axle shaft 185 journalled at its ends in upright frame plates of the machine and extends transversely of the machine above, and substantially parallel to, the cam shaft 135. Actuator sectors 188, equal in number to the number of selector sectors plus two, are journalled in side-by-side, or ordinal, arrangement on the axle shaft 185 and extend from the axle shaft toward the shiftable selector unit 11.

Each actuator sector is substantially of the shape of a section of a circle and the axis of the axle shaft 185 extends through the centers of the hypothetical circles of which the corresponding sectors constitute sections. Gear teeth 189 are provided on the arcuate edges of the actuator sectors and each sector is provided with an elongated opening 190 having a longitudinal curvature centered on the axis of shaft 185.

Figure 5:
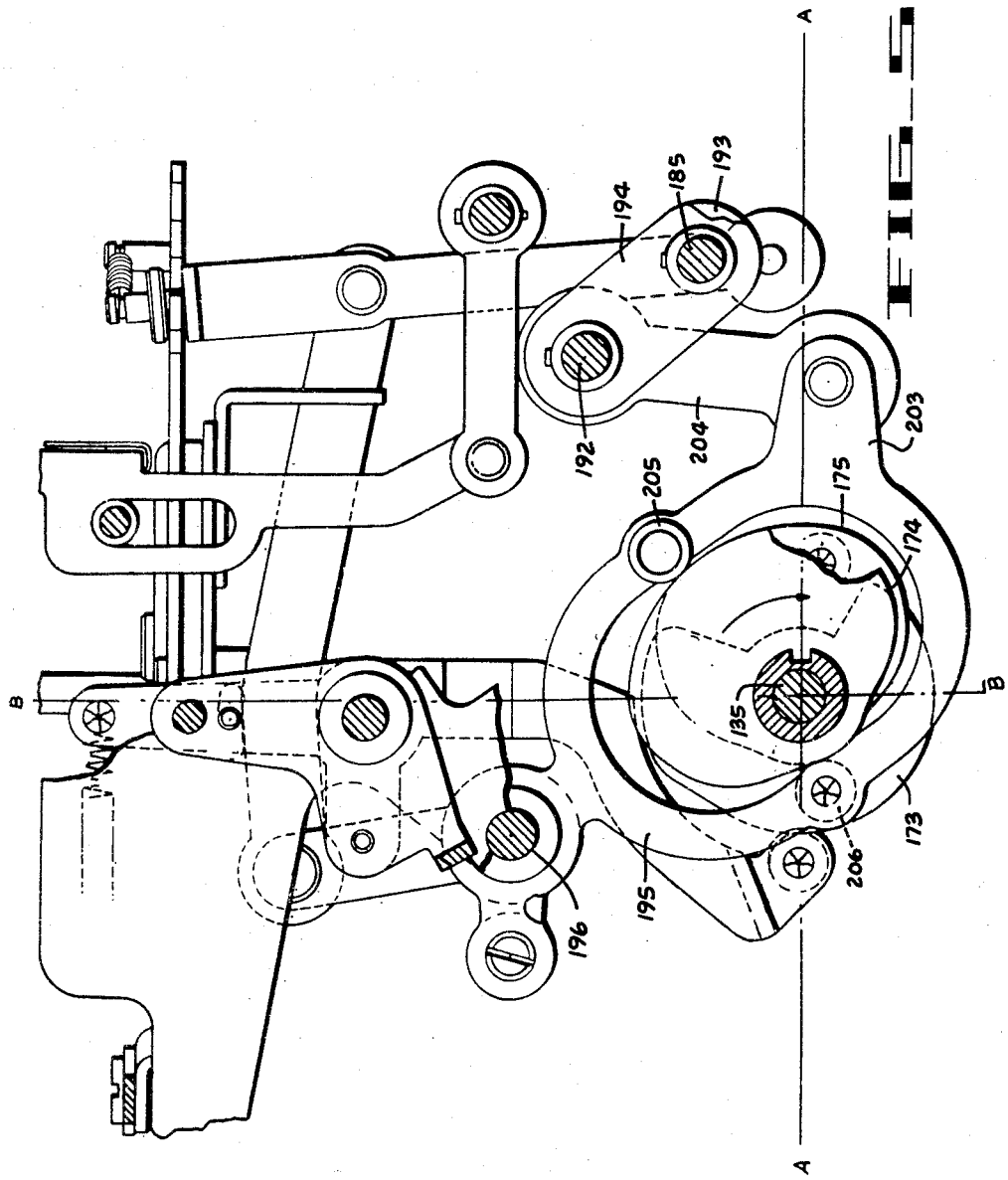
Fig. 5 is a cross-sectional view on a plane parallel to and to the left of the section plane of Fig 2 and shows the operating means, including the operating bail and bail actuating lead and follow cams, for the actuator sectors of the machine and also shows the print wheel detent operating mechanism and the associated tens-transfer operating cam.

A rod, or bail, 192 extends through the openings 190 in the several actuator sectors and arms 193 and 194, Fig. 5, connected between the corresponding ends of the bail 192 and the shaft 185, near the correspondingly opposite ends of this shaft, support the bail 192 in spaced and parallel relationship to the axle shaft 185.

A yoke 195 of somewhat elliptical shape surrounds the cam shaft 135 and the actuator trail and lead cams 174 and 175 and has an upwardly and forwardly projecting extension pivotally mounted on a fixed cam follower shaft 196 which extends transversely of the machine above, and forwardly of, the cam shaft 135 and is supported in the side and intermediate plates of the machine frame.

An arm 203 extends rearwardly from the rearward end of the yoke 194 and is pivotally connected at its rearward, or distal, end to the lower end of a link 204, the upper end of which is connected to the actuator bail 192.

The yoke carries on its upper side a cam following roller 205 riding on the peripheral edge of the actuator trail cam 174 and on its lower side a cam following roller 206 riding on the peripheral edge of the actuator lead cam 175, the yoke being disposed between the cams 174 and 175 and the roller 205 projecting from the right-hand side of the yoke while the roller 206 projects from the left-hand side of the yoke.

With this arrangement, the bail 192 is positively moved both downwardly and upwardly and, during an operating cycle of the machine, is first moved to its lower position, is maintained in its lower position for a predetermined time interval and is then restored to its upper position.

A corresponding resilient connecting member 208 is disposed adjacent one side of each actuator sector 188 and is pivoted at its upper end to the sector near the upper radial edge of the sector by a pivotal connection 209 and extends from the pivotal connection along the opening 190 in the actuator sector and past the side of the bail 192 remote from the axle shaft 185. The connecting member is angularly bent intermediate its length to provide at the side thereof adjacent the bail 192 a concave seat 210 which receives a roller 210' rotatably mounted on the bail 192, the roller 210' being received in the corresponding seat 210 when the bail is in its upper limiting position relative to the corresponding sector 188. The connecting member is resiliently held in engagement with the bail by a spring 211 connected between the sector 188 and the distal end of an arm 212 projecting angularly from the pivoted end of the member 208. The portion of the connecting member 208 between the seat 209 and the free end of the latch lever constitutes a longitudinally curved tail portion 213 directed from the bail 192 toward the shaft 185.

When the bail is pulled downwardly by the action of the lead cam 175 on the cam follower 206, the engagement of the bail in the latch lever seat 210 pulls the sector 188 down until the sector is positively stopped at an angular position predetermined by the setting of a corresponding selector sector 33, at which time the bail moves out of the concave seat 210 and along the concave edge of the tail portion 213 of the connecting member to complete the downward movement of the bail. As the bail moves along the tail portion 213, it maintains downward pressure on the sector 188 and the angularity of the tail portion to the remainder of the connecting member is such that this pressure is sustained by the force of spring 211 when the bail starts up again and until the bail positively engages the sector and returns it upwardly to its home, or full-cycle, position, the bail being moved upwardly by the action of trail cam 174 on follower 205.

The actuator unit is fixedly mounted in the machine just to the left of the shiftable selector unit when the latter is in its right-hand, home position. When the selector unit is stepped to the left by its escapement mechanism, the orders of the selector unit from left to right are successively brought into alignment with the corresponding orders of the actuator mechanism from right to left. Thus, the digits carried by orders in the left-hand end portion of the selector will be read out by corresponding orders in the right-hand end portion of the actuator unit.

When the bail 192 moves upwardly relative to the actuator sectors 188, it comes into engagement with abutment formations 214 at the upper ends of the openings 190 in the sectors, simultaneously moving into the seats 210 of the members 208, and then moves the actuator sectors upwardly until the upper radial edges of the sectors abut against a stop bar 215 in the upper, or full-cycle, position of the actuator sectors.

The mechanism, as mentioned above, which drivingly connects the actuator sectors 188 to the selector sectors 33, comprises a positive transmission gear mechanism disposed between the actuator and selector sectors and generally indicated at 330 in Fig. 2. This gear mechanism 330 comprises a bail including parallel legs, as indicated at 331 in Fig. 2, spaced apart a distance somewhat greater than the length of the actuator mechanism and interconnected by a suitable cross member 332 and the gear shafts 334, 335 and 336. A top cross member, or transmission shifting, member 333, Fig. 9, extends perpendicularly from the upper end of one leg above the top gear shaft and is used to shift the positive gear transmission mechanism, as will later appear.

The bail provides a rigid cage, or carriage, for the transmission gears and the three gear shafts, or axles, 334, 335, and 336 extend transversely of the space between the bail legs 331 in spaced-apart and parallel relationship to each other and are mounted at their ends in the corresponding bail legs at locations spaced apart longitudinally of the legs. A plurality of transmission gears 337 are journalled on the upper gear shaft 334 in side-by-side, or ordinal, arrangement, the number of these gears being equal to the number of actuator sectors 188 and the gears being constantly in mesh with the corresponding actuator sectors and with the corresponding print wheel drive gears 217, as is shown in Fig. 4. A plurality of intermediate, or reversing, gears 338 are journalled in side-by-side, or ordinal, arrangement on the intermediate gear axle 335 and these gears mesh respectively with the gears 337. A plurality of gears 340 are journalled on the gear axle 336, also in side-by-side, or ordinal, arrangement, the number of these gears also being the same as the number of selector sectors, and the gears 340 mesh with the corresponding intermediate or reversing gears 338. The gears 337, 338 and 340 are preferably all ten-tooth gears of the same size with teeth of the size of the teeth on the selector sectors 33 and on the actuator sectors 188.

The upper gear axle 334 is extended beyond the legs of the gear carrying cage and is mounted at its ends in the intermediate frame plates of the machine so that the entire cage can swing about the axis of the axle 334 carrying with it the gear axles 335 and 336 and the gears 338 and 340.

In the addition and subtraction cycles of the machine, as will be later explained, the cage of the positive transmission mechanism is rocked by the cam 179 in a manner to bring the transmission gears 340 corresponding to the number of selector sectors which have been stepped to the left during the entry of the figures to be added or subtracted into the selector mechanism, into mesh with the corresponding selector sectors 33 during the first portion of the machine cycle in which the actuator segment bail 192 is given its downward stroke. During the downward stroke of the actuator bail, the actuator sectors in alignment with the selector segments, which have been manually set and which are engaged or meshed with corresponding positive transmission gears 340, will be moved to differentially set positions and the corresponding selector segments will be returned to their home, or "0," position at which they are stopped by the stop bar 27. During the downward movement of the corresponding actuator sectors, the print wheels 230, in alignment with these sectors, are rotated by the corresponding gears 337, 217 and 226 to bring the numerals embossed on the print wheels, which correspond to the numbers for which the corresponding selector sectors are set, in position to impinge the platen 242 during the printing movement of the print wheels, as described above.

The accumulator mechanism of the adding machine is generally indicated at 390 and particularly illustrated in Figs. 2, 6, 7 and 9. This mechanism is provided as a unitary structure which is installed in the machine through an opening 391 in the machine base 392 and has a rigid frame including brackets 393 and 394 which are disposed one along each side of the opening 391 and extend upwardly through the opening. These brackets have perpendicularly offset, apertured lugs, which extend into recesses in the base at the corresponding sides of the opening 391 and are secured to the base by screw fasteners, as indicated at 395. The frame also includes left and right end plates 396 and 397, disposed in spaced-apart and parallel relationship to each other, and a plurality of separator plates 398 uniformly spaced apart between the end plates 396 and 397 and disposed in parallel relationship to each other and to the end plates. The end plates and the separator plates are provided with aligned apertures including one series of aligned apertures near the bottom edges and the front ends of these plates and one set of aligned apertures near the bottom edges and the rear ends of the plates. A supporting bar 400 of rectangular cross-sectional shape extends through the series of apertures near the front edges of the plates while a similar bar 401 extends through the series of apertures near the rear edges of the plates. The bars 400 and 401 are secured to the upstanding portions of the brackets 393 and 394 by suitable means, such as the screw fasteners 402 extended through apertures in the brackets and threaded into tapped holes in the corresponding ends of the bars.

Suitable clamping means such as a base plate 403, as illustrated in Fig. 2, or clamping strips, underlie the bottom edges of the plates 396, 397 and 398 parallel to the supporting bars 400 and 401. Screw fasteners 404 extend through apertures in the clamping means and are threaded into tapped holes extending transversely of the bars 400 and 401 to clamp the end plates and spacer plates rigidly in their position on the supporting bars. The plates are also reinforced in their spaced and parallel relationship to each other by various shafts and through pins, as will become apparent during the following description of the accumulator mechanism.

A main axle shaft 405 extends transversely through the plate assembly intermediate the height of the plates and is secured at its ends in the end plates 396 and 397, projecting at its ends beyond the outer sides of these end plates shown in Fig. 6. A plurality of accumulator gears 406, Figs. 2 and 7, are mounted in side-by-side or ordinal relationship on the shaft 405 and are disposed one gear in each space between the adjacent spacer plates 398 and one gear between each end plate 396 and 397 and the adjacent spacer plate, there being eleven of these accumulator gears or one more than the ten selector sectors, as described above. Each accumulator gear 406 has twenty gear teeth 407 uniformly spaced apart around its periphery and a tens-transfer cam structure 408 is disposed against one side of each accumulator gear and rigidly secured to the gear for rotation therewith. The accumulator gear and the tens-transfer cam structure are shown in the "9" position so that one additional step in a positive direction will effect the tens-transfer.

Each tens-transfer cam structure 408 comprises a bar extending diametrically of the associated accumulator gear and having an enlarged and apertured center portion through which the shaft 405 extends and double beveled end portions terminating in blunted points disposed in alignment with interdental spaces at diametrically opposite sides of the gear.

A drive gear shaft 410 extends transversely through the plate assembly above and parallel to the shaft 405. The shaft 410 also extends at its ends outwardly of the outer sides of the end plates 396 and 397 of the plate assembly. Accumulator drive gears 411 are journalled in side-by-side or ordinal arrangement on the shaft 410, there being eleven of these gears disposed one in each space between adjacent plates of the plate assembly and meshing with the corresponding accumulator gear 406. Each drive gear has ten gear teeth 412 so that it requires two rotations of a drive gear to complete one rotation of the associated accumulator gear.

A detent shaft 414 extends transversely through the plate assembly at the upper, width reduced end of the assembly and detent pawls 415 are rockably mounted on the shaft 414 in ordinal arrangement along the shaft, there being one detent pawl for each of the accumulator drive gears 411. Each pawl has at one end a bearing portion 416 receiving the shaft 414 and at its other end a V-shaped detent formation 417 which engages in the interdental space at the upper side of the associated drive gear 411 to hold the drive gear and corresponding accumulator gear against accidental rotation. Each pawl is resiliently held in movement resisting engagement with its associated drive gear by a tension spring 418 connected between the pawl at a location intermediate the length of the pawl and a tie rod 419 which extends transversely of the plate assembly below and parallel to the detent shaft 414.

With the above-described arrangement it will be apparent that, when the positive gear transmission 330 is rocked, as described above, to mesh its gears 340 with the accumulator drive gears 411 during the upward or return stroke of the actuator sectors 188, the drive gears 411 will be rotated in an additive or clockwise direction and will impart an opposite or counterclockwise rotation to the associated accumulator gears 406.

Means are also provided for rotating the accumulator gears in a negative or subtractive direction during the upward stroke of the actuator sectors 188 and this means includes a negative or subtractive gear transmission assembly, generally indicated at 420, Fig. 2.

The gear assembly 420 comprises a bail having parallel legs 421 spaced apart a distance at least as great as the length of the actuator mechanism and the accumulator mechanism and connected by a cross portion 422 extending transversely across the space between and joined at its ends to the legs 421. Spaced-apart and parallel gear shafts 423 and 424 are mounted at their ends in the bail legs 421 and extend across the space between these legs. A plurality of ten-tooth transmission gears 425 are mounted in side-by-side or ordinal arrangement on the shaft 423 while a plurality of similar, ten-tooth transmission gears 426 are mounted in side-by-side or ordinal arrangement on the shaft 424 and mesh with corresponding gears 425.

It will be noted that the positive gear transmission 330 has an odd number of gear sets, three such sets being shown in the accompanying drawings, while the negative gear transmission 420 has an even number of gear sets, two such gear sets being illustrated. This provides an arrangement wherein the positive gear transmission will rotate the accumulator drive gear 411 in one direction to add a positive or additive value to the accumulator while the negative transmission 420 will rotate the drive gears in the opposite direction to apply a subtractive or negative value to the accumulator.

The negative transmission mechanism is rocked into and out of engagement with the accumulator drive gears 411 by mechanism fully illustrated and described in application S. N. 407,016 of which this application is a division, but which is not shown or described in detail in this disclosure.

From the above description, it will be observed that the actuator sectors 188, while undergoing their upward strokes, are effective to rotate the accumulator drive gears 411 in either a positive direction or a negative direction, depending upon whether the positive transmission gear mechanism 330 or the negative transmission gear mechanism 420 is moved into driving engagement with the accumulator drive gears 411.

For a more convenient understanding of the subsequent description, it will be noted that, when looking at the accumulator mechanism from the right-hand side of the machine, as in Fig. 2, the positive rotational direction of the accumulator drive gears 411 is clockwise and that of the associated accumulator gears 406 is counter-clockwise and that the direction of negative rotation of the drive gears 411 is counter-clockwise and the direction of negative rotation of the accumulator gears 406 is clockwise.

As in all mechanical accumulators, it is necessary to provide mechanism which becomes effective when any particular accumulator gear advances past its "9" and to its "0" position to advance the accumulator gear of the next highest order an angular extent corresponding to one gear tooth, or a single unit space. This is a tens-transfer mechanism and in the accumulator of the present invention this mechanism is provided in two symmetrical parts located at diametrically opposite sides of the accumulator gears so that it can accomplish its tens-transfer function in either a positive or negative rotational direction of the corresponding accumulator gears, depending upon whether a positive or a negative entry is being stored in the accumulator.

Shafts 438 and 439 extend transversely of the accumulator plate assembly below the accumulator gears 406 and in spaced and parallel relationship to each other and the accumulator gear shaft 405. A number of bellcrank levers 440, equal in number to the number of accumulator gears 406, are pivotally or rockably mounted at their knees on the shaft 438 in side-by-side, or ordinal, arrangement. Each of these bellcrank levers has one arm 441 extending downwardly and rearwardly toward the complementary shaft 439 and terminating substantially midway between the shafts 438 and 439 and has an arm 442 projecting upwardly and forwardly from the shaft 438 and provided near its upper end with a rearwardly directed hook formation 443. Bellcrank levers 444 are rockably mounted at their knees on the shaft 439 in side-by-side or ordinal arrangement relative to each other and are also equal in number to the number of accumulator gears 406. Each lever 444 has a leg 445 extending upwardly and forwardly toward the shaft 438 and terminating medially of the distance between the shafts 438 and 439, it being noted that the distal ends of the lever arms 441 and 445 overlap between the lever supporting shafts 438 and 439. Each lever 444 also has a rearwardly directed leg 446 provided near its distal end and on its upper edge with an upwardly directed hook formation 447. Tension springs 448 extend between the hook formation 443 and 447, each spring being connected at one end to the hook formation 443 on a bellcrank lever 440 and at its other end to the hook formation 447 on the opposite bellcrank lever 444 and tending to resiliently rock the two bellcrank levers toward each other about their pivotal mountings on the shafts 438 and 439.

A tens-transfer pawl 450 is pivotally mounted by a pivot connection 451 on the upper end of each bellcrank leg 442 and has an angularly-shaped arm 452 directed toward the aligned accumulator gear 406 and terminating at its distal end in a nose formation 453 which will engage a tooth of the aligned accumulator gear and rotate the corresponding gear through one unit space in a positive entry direction when the bellcrank lever 440 is rocked about the shaft 438 by the spring 448 in a direction such that the hook formation 443 moves toward the hook formation 447 of the opposite bellcrank lever 444. Adjacent the nose 453, the arm 452 is provided with a terminal shoulder 454 which engages a stop bar 455 extending transversely through the accumulator plate assembly and limits the rotational movement imparted to the accumulator gear by the nose 453 to a single unit space.

The axis of the stop bar 455 is in, or adjacent to, a plane including the axes of the accumulator gear shaft 405 and the bellcrank pivot shaft 438 intermediate the distance between the shaft 405 and the shaft 438 and this stop bar also serves as a tie rod to reinforce the accumulator plate assembly.

The pawl 450, in addition to the arm 452, includes a hook formation 456 which projects from the pawl radially of the pivotal connection 451 and in a forward direction and which is connected by tension spring 457 to a lug 458 projecting radially from the forward edge of the bellcrank arm 442 adjacent the shaft 438. The spring 457 resiliently urges the pawl 450 to rotate in a direction to raise the nose 453 into engagement with the teeth of the aligned accumulator gear when the bellcrank 440 is rocked in a rearward direction by the spring 448. The pawl is also provided with a radially directed stop arm 459, the distal end of which engages a stop pin, or stud, 460 carried by the bellcrank arm 442 to limit rotational movement of the pawl 450 by the spring 457. The arm 452 of the pawl is provided intermediate the length of its upper edge with a latching shoulder 461.

Shafts 462 and 463 extend transversely of the accumulator plate assembly above the accumulator gear shaft 405 and near the front and rear edges, respectively, of the plate assembly. These shafts 462 and 463 are disposed in spaced and parallel relationship to each other and to the shaft 405 and the shaft 462 is above the shaft 438 while the shaft 463 is above the shaft 439.

A plurality of latch levers 465 are rockably mounted each at its upper end on the shaft 462 in side-by-side, or ordinal, arrangement relative to each other. These latch levers depend from the shaft 462 and each carries at its lower end an abutment formation 466 which engages the shoulder 461 on the corresponding transfer pawl 450 and holds the pawl in retracted position with its nose 453 spaced from the corresponding accumulator gear 406. Each latch lever 465 has intermediate the length thereof and at the side thereof nearest the accumulator gears 406, a rearwardly extending nose formation 467 which abuts against a stop bar 468 when the lever is in latching engagement with its associated pawl 450 to limit rocking movement of the lever about the shaft 462 in a direction toward the accumulator gears. A tension spring 469, connected between the lower end portion of the latch lever 465 and a tie rod 470 extends transversely through the accumulator plate assembly between the lower end of the latch lever 465 and the accumulator gear assembly, resiliently urges the latch lever to rock toward the gear assembly.

A live pawl, or actuating dog, 472 is disposed against one side of each of the latch levers 465 and pivotally connected to the corresponding latch lever by a pivotal connection 473 located medially of the length of the latch lever. The actuating dog 472 is provided with an abutment formation 474 which projects radially from the pivotally mounted portion of the dog into the path of the outer end portions of the tens-transfer cam 408 carried by the corresponding accumulator gear and is also provided with a forwardly directed arm 475 connected near its distal end by a spring 476 to the upper end portion of the latch lever 465. The spring 476 resiliently urges the actuating dog 472 to rotate relative to the associated latch lever 465 until a stop arm 477 on the actuating dog is brought to bear against a stud 478 projecting laterally from the corresponding latch lever 465. The stop arm 477 bears against the side of the stud 478 remote from the accumulator gear assembly so that, when the accumulator gear 406 is rotating in a positive, or counter-clockwise, direction, as viewed in Fig. 2, and an end of the tens-transfer cam member 408 engages the abutment formation 474 applying pressure in a downward direction to this abutment formation, the actuating dog will not rock relative to the associated latch lever 465 but, the latch lever will be forced to swing away from the accumulator gear assembly releasing the abutment formation 466 on the lower end of the latch lever from the latching shoulder 461 on the associated transfer pawl 450. This frees the pawl for rocking movement of this pawl and the associated bellcrank 440 about the shaft 438 in a direction to move the nose 453 against a tooth of an aligned accumulator gear and rotate the gear one unit space in the positive, or counterclockwise, direction.

The spring-biased pivotal connection between the tens-transfer pawl 450 and the associated bellcrank 440 permits the bellcrank lever and the pawl carried thereby to be returned from a gear moving position to their home, or full-cycle position, as illustrated in Fig. 2, without imparting any rotation in a reverse, or negative, direction to the associated accumulator gear and the spring-biased, pivotal connection between the actuating dog 472. The associated latch lever 465 permits the end portions of the corresponding tens-transfer cam 408 to move past the abutment formation 474 of the actuating dog in a negative, or clockwise, direction without moving the associated latch lever 465 to release the corresponding tens-transfer pawl 450.

The nose 453 on each tens-transfer pawl 450 is offset laterally to the left from the abutment formation 474 of the actuating dog 472 mounted on the latch lever 465 holding the particular pawl so that, when the latch lever is released from its associated pawl by engagement of the tens-transfer cam 408 on the accumulator gear in alignment with the latch lever 465, the nose 453 will engage a tooth of the accumlator gear of the next higher order, that is, the accumulator gear immediately to the left of the gear carrying the tens-transfer cam which released the latch so that the gear of the next higher order will be advanced one unit space in the positive, or additive, direction.

A tens-transfer pawl 485 is pivotally mounted on each of the negative bellcrank levers 444 and urged by a tension spring 486 connected between a hook formation on the pawl and a lug on the bellcrank lever to a rotational position in which the stop arm 487 on the pawl engages the stop stud 488 on the arm 446 of the lever 444. Each transfer pawl 485 carries a terminal nose formation 489 effective when the arm 444 is rocked by the spring 448 toward the corresponding accumulator gear 406 to move the accumulator gear engaged by the particular nose 489 one unit space in a negative, or clockwise, direction, as viewed in Fig. 2. Each transfer pawl 485 is also provided with a terminal shoulder 490 which engages a stop bar 491 extending transversely of the accumulator plate assembly in spaced and parallel relationship to the stop bar 455 to limit swinging movements of the pawl 485 under the influence of spring 448 to an extent such that the nose 489 will move the corresponding accumulator gear one unit space only. The assembly of each negative bellcrank 444 and corresponding transfer pawl 485 is identical with the corresponding positive assembly including a bellcrank lever 440 and pawl 450. The spring-biased pivotal connection between the pawl 485 and the bellcrank 444 permits the pawl and bellcrank assembly to be returned to its home, or full-cycle, position after a gear rotating movement without imparting any rotational movement to the associated accumulator gear.

Negative latch levers 492 are pivotally mounted at their upper ends on the shaft 463 in side-by-side, or ordinal, relationship to each other and depend from the shaft 463 toward the corresponding transfer pawls 485. Each latch lever 492 carries on its lower end an abutment formation 493 which engages with the latching shoulder on the upper edge of the corresponding pawl 485 to releasably hold the pawl in its home, or full-cycle, position retracted from the corresponding accumulator gear. A tension spring 494 is connected between each latch lever 492 near the lower end of the lever and a tie rod 495, extending transversely of the accumulator plate assembly, resiliently urges the latch lever to swing about the shaft 463 to its pawl latching position. A nose formation 496, directed forwardly from the forward edge of the lever 492 medially of the length of the lever, engages a stop bar 497 extending transversely of the accumulator plate assembly to stop the spring induced swinging movement of the latch lever 492 when the lever has been brought by the spring to its latching position.

A latch lever actuating pawl 498 is pivotally mounted on each latch lever 492 medially of the length of the latch lever by a pivotal mounting 499 and a tension spring 500 connected between one end of the dog 498 and the upper end portion of the lever 492 resiliently urges the dog to rotate relative to the associated lever 492 until the stop arm 501 on the dog is brought to bear against the outer side of the stop lug 502 extending laterally from the upper portion of the latch lever 492.

The dog 498 carries an abutment formation 503 disposed in the path of the end portions of the tens-transfer cam member 408 carried by the corresponding actuator gear 406. The spring tension on the dog 498 is such that when the gear 406 is rotating in a positive, or counter-clockwise, direction, as viewed in Fig. 2, the ends of the tens-transfer cam will pass the abutment formation 503 and rock the dog relative to the associated latch lever 492 without moving the latch lever out of latching engagement with the corresponding pawl 485. However, when the accumulator gear is rotated in a negative, or clockwise, direction, as viewed in Fig. 2, engagement of an end of the tens-transfer cam 408 with the corresponding abutment formation 503 will tend to move the actuating dog 498 relative to the latch lever 492 in a direction in which movement is precluded by the stop arm 501 and stud 502, thereby swinging the latch lever about the shaft 463 in a direction to release the associated transfer pawl 485 and free this pawl to impart a single step, or unit space, rotational movement to a corresponding accumulator gear. The terminal nose 489 of the negative gear moving assembly is laterally offset to the left from the position of its associated abutment formation 503, in the same manner as in the positive gear rotating assembly, so that, when the tens-transfer cam on one accumulator gear moves the aligned latching lever 492 to release the corresponding transfer pawl 485 and bellcrank lever 446, the nose 489 will engage and impart a one step or unit space rotational movement to the accumulator gear of the next higher order.

With the above-described arrangement, the tens-transfer operation will be carried forward in either a positive or a negative direction, but in each case the tens-carry operation will be made from an accumulator gear passing to or through its "0" position to the accumulator gear of the next higher order immediately to the left of the gear passing to or through its "0" position.

The operation of the tens-transfer mechanism, as described above, is controlled by a bail, generally indicated at 505, the cross or intermediate, portion 506 of which constitutes a bail rod extending transversely of the accumulator plate assembly below the distal ends of the legs 441 and 445 of the bellcrank levers 440 and 444. The legs 507 and 508 of the bail 505 are pivotally mounted at the open end of the bail on a shaft 509 which is supported on the end plates 396 and 397 of the accumulator plate assembly parallel to, and forwardly of, the shaft 438. A bellcrank lever 510, Fig. 8, is pivotally mounted at one end on the intermediate frame plate 187 of the machine by a pivotal mounting 511 disposed rearwardly of, and below the cam shaft 135. One arm 512 of this bellcrank lever 510 extends forwardly from the pivotal connection 511 and is connected at its forward end to the adjacent end of the bail 506 by a link 513.

A second arm 514 of the bellcrank lever extends upwardly from the leg 512 near the free, or distal, end of the latter and terminates at a location above the tens-transfer actuating cam 173. A cam following roller 515 is carried on the upper end of the bellcrank arm 514 and rides on the peripheral edge of the cam 173. A tension spring 516 is connected to the leg 512 and depending therefrom is connected at its lower end to the machine frame and resiliently urges the bellcrank lever 510 downwardly and the cam following roller 515 into engagement with the edge of the cam 173.

The bail 505 has three operative positions including: (1) an intermediate position in which it is slightly below the distal end portions of the bellcrank lever arms 441 and 445 so that, when any one of the pawls 450 or 485 is unlatched, the corresponding spring 448 will swing such transfer pawl and its associated bellcrank lever about the supporting shaft 438 or 439 an angular extent such that the pawl cannot be relatched by the corresponding latch lever when the tens-transfer cam 408 moves past the abutment formation 474 or 503 which occasioned the unlatching of the pawl; (2) a top position in which it is raised sufficiently above its intermediate position to restore any pawl which has been unlatched; and (3) a home, or full-cycle, position in which it is disposed below its intermediate position a distance sufficient to permit the tens-transfer action to take place.

After being unlatched and moved to a position at which it cannot be relatched, the movement of the pawl and its carrying bellcrank lever is arrested by the engagement of the distal end portion of the corresponding bellcrank lever arm 441 or 445 with the bail rod 506 with the latter in its intermediate position, so that the tens-carrying operation is delayed until after the entry has been made into the accumulator and the actuator sectors have returned to their home, or full-cycle, position.

The shape of the cam 173, Fig. 8, and its rotational position on the cam shaft 135 is such that the bail rod 506 is held up in its intermediate position during the portion of the machine cycle in which the actuator sectors accomplish their downward and upward strokes and completely enter the selected value into the accumulator.

Immediately after the actuator sectors have returned to their full-cycle position, the cam following roller 515 drops from the lobe portion 295 into the recess 517 of the cam 173 moving the bail rod 506 downwardly away from the bellcrank lever arms 441 and 445 to its full-cycle position, thereby freeing those bellcranks and pawl assemblies which have been unlatched to simultaneously complete their tens-carrying operation under the power of the associated springs 448.

Cam following roller 515 does not ride out of the recess 517 of the cam 173 before the end of the operating cycle so that the bail rod 506 is left in its lowered, or full-cycle, position when the operating cycle terminates. At the beginning of the next operating cycle of the machine, the cam following roller 515 rides up on the lobe portion 295 of the cam 173 first raising the bail rod 506 to its top position somewhat above its intermediate position to restore all of the released bellcrank and pawl assemblies to their latched condition and to then lower the bail slightly to its intermediate position, as described above.

When an accumulated total is taken or read out from the accumulator, the accumulator gears are rotated by the downward stroke of the actuator sectors 188 in the direction opposite to that in which these gears were rotated to accumulate a positive or negative total. Thus, as viewed in Fig. 2, when a positive total is taken, the accumulator gears will be rotated in a clockwise direction until the end of the tens-transfer cams 408 approaching the positive latch lever actuating dog abutments 474, engage the undersides of these abutments. As the latch lever actuating dogs 472 are now locked against movement by means presently to be described, the rotational movement of the accumulator gears will be stopped when the end portions of the tens-transfer cams 408 engage the abutments 474 with all of the accumulator gears in "0" position with relation to the positions of the ends of the tens-transfer cams relative to the abutments 474. The accumulator is then in positive zero setting, but, since the opposite ends of the tens-transfer cams will still be above the corresponding abutment formations 503 on the negative side of the accumulator, the negative setting of the accumulator is a series of nines.

Assuming that the accumulator has thus been cleared by a positive total taking cycle, leaving the accumulator in a positive "0" and a negative "9" setting, and that a number, for example, a "1," is subtractively introduced into the accumulator, moving the lowest order accumulator gear through one unit space in a negative direction, if a total were now taken, an erroneous value of ".00T" would be printed. Likewise, if the accumulator were cleared to its negative zero setting by the printing of a negative total, leaving the ends of the tens-transfer cams against the undersides of the negative abutment formations 503, the positive setting would be a series of nines since the ends of the tens-transfer cams adjacent the positive abutment formations 474 are now disposed above these formations. The additive introduction of a number into the accumulator will now produce an erroneous total, the total printed, if the number added is "1" being ".00T" instead of ".01T" as it should be.

This error is not involved in the theoretical operating principles of the machine but is introduced by structural limitations, particularly the requirement that the end portions of the tens-transfer cams and the abutment formations 474 and 503 have definite thickness in planes perpendicular to the rotational axis of the accumulator gears.

This mechanical limitation of the accumulator can be corrected by adding a "1" in the lowest order of the accumulator, that is, by moving the lowest order accumulator gear one unit space in the proper direction when a value is subtractively introduced into the accumulator when the accumulator is in its positive zero setting or when a value is additively introduced into the accumulator when the latter is in its negative zero setting. This correction is referred to in the art as the addition of the "fugitive 1."

The mechanism for adding in the "fugitive 1" comprises the 11th, or highest, order of accumulator gears and mechanism for stepping the lowest order gear one unit space in the proper direction whenever the highest order gear passes its positive zero location in its positive rotational direction or its negative zero location in its negative rotational direction.

The mechanism referred to comprises positive and negative latch levers 465′ and 492′ rockably suspended from the shafts 462 and 463, respectively, at diametrically opposite sides of, and in alignment with, the 11th order accumulator gear 406, and latch lever actuating dogs 472′ and 498′ pivotally mounted on the latch levers 465′ and 492′, respectively, and spring urged to predetermined positions relative to the corresponding latch levers in the manner described above.

A positive transfer bail 520 extends transversely of the accumulator above the forward portion of the accumulator plate assembly and is secured at its left-hand end to the upper end portion of the positive latch lever 465′ of the highest order of the accumulator and at its right-hand end to the upper end portion of the positive latch lever of the lowest accumulator order. A corresponding negative transfer bail 521 extends transversely of the accumulator above the rearward portion of the accumulator plate assembly and is secured at its left-hand end to the upper end portion of the negative latch lever 492′ of the highest, or 11th, order of the accumulator, and at its right-hand end to the upper end portion of the corresponding negative latch lever of the lowest order of the accumulator.

When the 11th order accumulator gear passes through its positive "0" position with a positive rotational direction, the adjacent end of the corresponding tens-transfer cam 408 engages the abutment formation 474 on the actuating dog of the positive latch lever 465′ and rocks this latch lever. This rocking of the latch lever 465′ rocks the corresponding bail 529 and the bail, in turn, releases the positive latch lever 465 of the lowest order from its associated pawl 450 so that the lowest order accumulator gear will be advanced one unit space near the end of the operating cycle when the bail rod 506 moves away from the bellcrank lever arms 441 and 445 in the manner described above.

Similarly, when the 11th order accumulator gear passes through its "0" position with a negative direction of rotation, its tens-transfer cam rocks the associated negative latch lever 492' which, through the negative transfer bail 521, rocks the negative latch lever of the first order accumulator gear, thereby conditioning the tens-transfer mechanism of the 1st order to add a negative "1" to the lowest order accumulator gear near the end of the operating cycle, as explained above.

Referring particularly to Figs. 7 and 9, a T-shaped blocking member or gate, generally indicated at 523, is pivotally mounted near one end and centrally of the width thereof on the right-hand end portion of the accumulator gear shaft 405 projecting outwardly of the right-hand end plate 397 of the accumulator plate assembly. This member 523 is provided on its pivoted end with a symmetrical crosshead 524, the opposite end portions of which are disposed perpendicular to the longitudinal center line of the member and extend substantially equal distances therefrom. The outer portions 525 and 526 of the crosshead are disposed perpendicular to the longitudinal center line of the center, or intermediate, portion thereof so that the outer portions have their greatest cross-sectional dimensions substantially in a plane including the axis of the accumulator gear shaft 405.

The blocking member or gate is provided at its free, or distal, end with a symmetrical formation 527 of a width greater than the width of the intermediate portion of the member. The formation 527 is provided at its outer end with oppositely disposed cam edges 528 and 529 spaced substantially equal distances from the longitudinal center line of the member 523 and symmetrically convergent toward the axis of the shaft 405. Inwardly of the cam edges 528 and 529 the formation 527 provides shoulders 530 and 531 which are substantially parallel to the longitudinal center line of the blocking gate and equally spaced from this center line.

The blocking member 523 has two operative positions in one of which the shoulder 530 at the forward side of the blocking member engages the stop bar 455 to positively position the blocking member in the corresponding operative position. In the alternative operating position, the shoulder 531 positively engages the stop bar 491 to positively position the blocking member in this alternative operative position.

The arm 441 of the bellcrank lever 440 of the lowest order of the accumulator is provided intermediate its length with an upwardly and rearwardly projecting arm 532. This arm is provided at its upper end with a laterally offset tongue formation 533 which is engageable with the adjacent cam edge 528 of the blocking member 523 to rock the blocking member about its pivotal mounting on the shaft 405 to its operative position in which the shoulder 531 engages the stop rod 491. An arm 534, similar to the arm 532, extends upwardly and rearwardly from the leg 445 of the bellcrank 444 of the lowest order of the accumulator. This arm 534 carries on its distal end a laterally extending tongue formation 535 which is engageable with the adjacent cam edge 529 of the blocking member 523 to rock the blocking member about the shaft 405 to the operative position of the blocking member in which the shoulder 530 thereof engages the stop bar 455, this position being illustrated in Figs. 7 and 9.

It will be recalled that when the 11th order accumulator gear passes through its "0" position in a positive direction, it rocks the positive latch lever 465 of the lowest order accumulator gear from the associated transfer pawl 450 thereby freeing the pawl 450 and the corresponding bellcrank lever 440 for rocking movement under the influence of the associated spring 448 when the bail cross member 506 is retracted from the legs 441 and 445 of the levers 440 and 444. This rocking movement of the bellcrank lever 440 about its pivotal mounting on the shaft 438 will swing the blocking member 523 to its alternate operative position, in which the shoulder 531 engages the stop bar 491, as described above. Similarly, when the highest order accumulator gear moves through its negative zero position in a negative rotational direction, it unlatches the bellcrank lever 444 of the lowest order of the accumulator and, when this bellcrank lever swings in its accumulator gear rotating movement, the tongue 535 on the distal end of the arm 534 engages the cam edge 529 of the blocking member 524 to move the blocking member to its operative position in which the shoulder 530 thereof engages the stop rod 455.

The position of the blocking member 523 in which the shoulder 531 engages the stop bar 491 will hereinafter be referred to as the negative blocking position of the blocking member and that position of the blocking member in which the shoulder 530 engages the stop bar 455 will be referred to as the positive blocking position of the blocking member.

Detent means are provided for releasably latching the blocking member 523 in its positive and negative blocking positions. This mechanism comprises a bellcrank lever 536 pivotally mounted at its knee on the stop bar 491 and having one arm 537 extending past the outer side of the blocking member 523 and a second arm 538 extending rearwardly from the stop bar 491. The arm 537 is provided near its distal end with spaced notches 540 and 541. The intermediate portion of the blocking member 523 has a laterally directed extension 542 carrying a stud 543 which seats in the notch 541 when the blocking member is in its positive blocking position and in the notch 540 when the blocking member is in its negative blocking position. A tension spring 544 connected between the distal end of the bellcrank lever arm 538 and the adjacent end of the accumulator gear shaft 405 resiliently urges the bellcrank arm 537 down against the stud 543 so that the blocking member 523 is releasably latched in its positive, or its negative, blocking position.

A bellcrank lever 545, Fig. 9, is pivotally mounted at its knee on a stud 546 carried at the upper forward corner of a lever arm supporting bracket 547 mounted on the machine base adjacent the right-hand end of the accumulator. A similar bellcrank lever 550 is mounted at its knee on a stud 551 carried at the upper rear corner of the bracket 547 and is functionally opposed to the lever 545.

The positive total sensing lever 545 has an arm 552 extending from the stud 546 toward the stud 551 and terminating medially of the distance between these studs in a hook formation 553 directed downwardly and forwardly away from the cam shaft 135. The lever 545 has a second arm 554 disposed substantially perpendicular to the arm 552 and extending upwardly and rearwardly to a location at which its distal end is disposed forwardly of, and in alignment with, the right-hand end of the positive transmission gear shaft 336 on which the transmission gears 340 are mounted.

The bellcrank lever 550 has one arm 555 extending from the stud 551 toward the stud 546 and terminating medially of the distance between the studs in a hook formation 556 directed away from the cam shaft 135 and spaced from the hook formation 552 in a direction such that the distal end portions of the arms 551 and 555 overlap between the studs 546 and 551. The lever 550 has a second arm 557 extending rearwardly and upwardly substantially perpendicular to the arm 555 with its distal end overlapping the rearward side of the gear shaft 424 of the negative gear transmission mechanism 420.

A roller 558 is disposed between the hook formations 553 and 556 at the sides of the bellcrank lever arms 552 and 555 remote from the cam shaft 135. The cross-head 524 of the blocking member 523 is disposed between the bellcrank lever arms 554 and 557 intermediate the length of these lever arms. The positive and negative transmission gear shafts 336 and 424 are disposed between the distal end portions of the bellcrank lever arms 554 and 557, and a tension spring 559, disposed between the blocking member crosshead 524 and the transmission gear shafts 336 and 424, is connected at one end to the bellcrank lever arm 554 and at its other end to the bellcrank lever arm 557 and resiliently pulls these lever arms one toward the other.

A link 560 is connected at one end to the roller 558 and carries at its other end a cam following roller 561 which is adapted to ride on the peripheral edge surface of the subtotal cycle cam 177.

When the cam follower 561 is free to follow the contour of the cam 177 and drops from the lobe 562 into the restricted portion 563 of the cam 177, the roller 558 will move in a direction away from the cam shaft 135 thereby freeing the bellcrank levers 545 and 550 to rock about their pivot studs 546 and 551 under the influence of spring 559 toward the corresponding transmission gear shafts 336 and 424. When the blocking member 523 is in its positive blocking position, as illustrated in Fig. 9, the end of the cross-head 524 of this member nearest the bellcrank lever arm 554 will engage an abutment formation 564 on the rearward, or inner, edge of this lever arm and stop the movement of the lever arm before it engages the positive gear transmission gear shaft 336. The end of the crosshead 524 nearest the lever arm 557 will, however, be spaced from the corresponding abutment formation 565 on the forward, or inner, edge of the bellcrank lever arm 557 so that this lever arm can move into engagement with the negative gear transmission gear shaft 424 and move the negative gear transmission to its operative position in which it provides a driving connection between the actuator gear sectors 188 and the accumulator drive gears 411, as described above.

When the blocking member 523 is in its negative blocking position, described above, it holds the bellcrank lever 557 against moving the negative gear transmission shaft 424 but frees the bellcrank lever arm 554 to engage the positive gear transmission shaft 336 and move the positive gear transmission mechanism to a position at which it provides a driving connection between the actuator gear sectors and the accumulator drive gears.

Thus, when the balance in the accumulator is positive in nature, the positive gear transmission mechanism 330 will be connected between the actuator sectors 188 and the accumulator drive gears 411 to read out the positive accumulator total and transmit this total to the printing mechanism; whereas, if the balance in the accumulator is negative, the negative gear transmission mechanism 420 will be activated to provide the driving connection between the actuator sectors 188 and the accumulator drive gears 411 to read out the negative total in the accumulator in the proper direction and transmit this total to the printing mechanism through the actuator sectors 188 and the set of gears 337 of the positive gear transmission mechanism 420, as described above.

The accumulator gear blocking means operated by the total sign sensing mechanism, as described above, comprises a positive blocking bail, generally indicated at 568, the legs of which are pivotally mounted at their distal ends on the ends of the shaft 462. The cross, or intermediate portion, 569 of bail 568 extends across the length of the accumulator immediately above the abutment formations 474 of the latch lever actuating dogs 472. Similarly, a negative blocking bail, generally indicated at 570, the legs of which are pivotally mounted at their ends on the shaft 463 near the ends of this shaft. The intermediate portion 571 of bail 570 extends across the length of the accumulator mechanism immediately above the abutment formations 503 on the actuator dogs 498 for the negative latch levers 492.

The leg of the bail 568 at the right-hand end of the accumulator mechanism is provided with an upwardly and rearwardly extending cam arm 572, Fig. 7. A cam actuating roller 573 is mounted on the leg 554 of the bellcrank lever 545, Fig. 9, in position to engage the cam arm 572 when the lever arm 554 is swung rearwardly and downwardly to engage the adjacent end of the positive gear transmission gear shaft 336 to move the positive transmission gear mechanism into operative association with the accumulator drive gears, as described above. The right-hand leg of the bail 570 is provided with an upwardly and forwardly projecting cam arm 574. The arm 557 of the negative bellcrank lever 550 carries a cam following roller 575 which rides on the outer edge of the cam arm 574 and rocks the bail 570 downwardly when the bellcrank lever arm 557 is moved to engage the gear shaft 424 of the negative gear transmission mechanism and move the negative gear transmission mechanism into an operative connection with the accumulator drive gears.

When the blocking member 523 of the total sign sensing mechanism, described above, is in position to free the positive bellcrank lever 545 for rocking movement about the pivot stud 546 to move the positive gear transmission mechanism into operative connection with the accumulator drive gears and the bellcrank lever 545 is so rocked in response to a total printing cycle of the machine, the cam following roller 573 riding on the outer edge of the bail cam arm 572 rocks the bail 568 about its mounting on the shaft 462 to bring the edge of the bail cross member 569 remote from the pivotal mounting into engagement with the upper edges of the abutment formations 474 of the actuating dogs 472 of the positive latch levers 465 to hold the abutments 474 against rocking upwardly against the force of the corresponding springs 476 when the ends of the tens-transfer cams 408 are brought against the undersides of these abutments during a total or subtotal printing operation. The bail 570 is similarly rocked by the action of the cam following roller 575 carried by the arm 557 of the negative bellcrank lever 550 so that the edge of the cross member 571 of this bail engages the upper edges of the abutment formations 503 and holds these abutment formations against upward movement.

An irregularly-shaped lever 917 is rockably mounted intermediate its length on the stud, or pin, 918 secured at one end to a bracket 919 carried by the print mechanism frame and spaced to the right from the right-hand side of this frame, the pin projecting to the left from the bracket 919, as shown in Fig. 9. The lever 917 has a forwardly and upwardly directed arm 920 extending past the rearward end of the link 692 which is moved forwardly when the subtotal control key is depressed. The link 692 carries at its rearward end a laterally projecting stud 921 which is opposed to the rearward edge of the arm 920 and is effective to impart to the lever 917 a counterclockwise rocking movement, as viewed in Fig. 9.

The lever 917 also has a rearwardly directed arm 922 having at its rearward end a downwardly directed hook formation 923, the arm 922 being in a plane parallel to the plane of arm 920 and spaced to the left therefrom, the lever 917 including a cross bridge portion, or bail, 924 which extends perpendicularly between the arms 920 and 922 and joins these arms together. The arm 922 has a portion 925 extending upwardly and forwardly from the pin 918 and constituting a tail portion, the purpose of which will be described in connection with the total printing cycle of the machine.

A cam following bellcrank lever 930 is rockably mounted on the cam follower supporting shaft 196 and has an upwardly directed arm 926 provided at its upper end with a laterally directed abutment 927 underlying the arm 922 of the lever 917 and engaged at its rearward edge by the hook 923 on the rearward end of the lever arm 922. The cam following lever 930 also has a rearwardly directed arm 928, the rearward end of which carries the cam following roller 561 which is connected to the upper end of link 560 and rides on the peripheral edge of the subtotal printing cam 177.

When the link 692 is moved forwardly by depression of the subtotal control key of the machine, the lever 917 is rocked in a counter-clockwise direction, as viewed in Fig. 9, on the stud 918. Raising of the lever arm 922 also releases the abutment 927 on the upper end of the arm 926 of the cam following bellcrank 930, so that this bellcrank can rock to permit the cam follower 561 to follow the contour of the subtotal printing cam 177 under the urgency of spring 559.

At the beginning of the subtotal printing cycle, the cam follower 561 rides off of the lobe portion 562 of the subtotal printing cam 177, freeing the link 560 for longitudinal movement in a direction to release the bellcranks 545 and 550 for movement by the spring 559. The positive bellcrank 545 or the negative bellcrank 550 will then be moved by the spring 559, depending upon the total sign sensing position of the blocking member 523, and, if the total be positive, the positive bellcrank 545 will move to shift the positive transmission gear mechanism into mesh with the accumulator drive gears and swing the positive gear blocking bail 568 into engagement with the positive tens-carry latch abutments 474, whereas, if the total sign be negative, the negative bellcrank 550 will move to shift the negative gear transmisison mechanism into mesh with the accumulator drive gears and simultaneously swing the negative gear blocking bail 570 into engagement with the negative tens-transfer latch abutments 503.

The actuator bail will now be moved downwardly and those actuator sectors drivingly connected to the accumulator gears which have been moved away from their "0" position will be moved downwardly until the corresponding accumulator gears are stopped by engagement of their tens-transfer cams 408 with the corresponding tens-transfer latch abutments 474 or 503 which are now locked by the locking bails 568 and 570, as described above. Those actuator sectors drivingly connect to the accumulator gears which were already in their "0" position will be held against downward movement by inability of the corresponding accumulator gears to turn.

During the downward movement of the actuator sectors, the total value is read out from the accumulator gears and the corresponding print wheels are turned to printing position corresponding to the positions of the accumulator gears in the corresponding orders. At the end of the downward movement of the actuator sectors, the printing operation will occur and the total will be printed on the tape.

The accumulator gears have now been reset to their positive or negative zero position, as the case may be, and in order that this operation should be a subtotal operation rather than a total operation, it is necessary to restore the accumulator gears to their original total indicating position during the upward stroke of the actuator sectors. This is accomplished by maintaining the positive or negative gear transmission mechanism, as the case may be, latched in mesh with the accumulator drive gears until near the end of the operating cycle where the actuator sectors are returned upwardly to their home, or full-cycle, position.

The lobe portion 562 of the subtotal printing cam 177 is of restricted angular extent, the major portion of the circumference of this cam being of such limited radial extent as to release the link 560 and free the bellcrank levers 545 and 550, except at the start and termination of the cycle, for the lobe 562 does not reengage the cam follower 561 to pull the link 560 and move the bellcrank levers 545 and 550 to their inoperative position until the actuator sectors have been returned to their home position. The positive or negative gear transmission is thus left in mesh with the accumulator drive gears during the upward stroke of the actuator sectors and the upward movement of the actuator sectors thus returns the print wheels to their "0" position and places the total read out of the accumulator during the downward stroke of the actuator sectors back in the accumulator during the upward stroke of the actuator sectors.

A cam following bellcrank lever 942 is rockably mounted at its knee or angle on the cam follower support shaft 196 and has a rearwardly directed arm 943 carrying at its rear end a cam following roller 941 which rides on the peripheral edge of the total printing cam 178. This lever 942 also has an upwardly and rearwardly directed arm 944 and a live point lever 945 is pivotally mounted at one end on the upper end of the lever arm 944 by a stud 946 and extends forwardly from this stud. The forward end of the lever 945 overlies the righthand side of the lever arm 926 and the total key actuated lever 938 has a downwardly and rearwardly extending arm 948, the lower end portion of which underlies a stud 949 carried by the lever 945 at the forward end thereof. Rotation of the lever 945 in a clockwise direction, as viewed in Fig. 9, relative to the lever arm 944 is limited by engagement of the end of a downwardly directed arm 951 of the lever 945 with an ear 950 which projects laterally from the rearward edge of the lever arm 944 below the stud 946. Angular movement of the lever 945 in a counter-clockwise direction, as viewed in Fig. 9, is resiliently urged by a spring 952 connected between the stud 949 and an eye formation 953 on the portion of the lever 942 adjacent the shaft 196.

A forwardly facing shoulder 954 is provided on the upper edge of the lever 945 near the forward end of this lever. The lever 945 has sufficient freedom of rotational movement in a clockwise direction relative to the lever arm 944 that, when counter-clockwise rotational movement is imparted to the lever 938 by forward movement of the link 691, the forward end of the lever 945 will be raised until the shoulder 954 engages the rearward edge of the abutment 927 on the upper end of the lever arm 926.

Rocking of lever 917 in a counter-clockwise direction by the ear 940 on the lever arm 939 raises the arm 922 of lever 917 disengaging the hook formation 923 from the abutment 927 on the upper end of lever arm 926.

Since depression of the total key 582 acts to cause a cyclic rotation of the machine cam shaft 135 and the cam 178 carried on the cam shaft 135, and since the total key is latched down during the corresponding cycle of the machine, the cycle will take place with the bellcrank cam following lever 942 latched to the bellcrank cam following lever 930 by the latch, or live point, lever 945 and with the hook 923 disengaged from the terminal abutment 927 of the lever arm 926.

At the beginning of the rotation of the cam shaft, the cam follower 941 rides off of the lobe portion 931 of the cam 178 and drops into the restricted portion 963 of this cam thereby releasing the link 560 and the positive and negative bellcrank levers 545 and 550 so that one of these bellcrank levers, depending upon the position of the total sign sensing blocking member 523, will be moved to swing the corresponding positive or negative gear transmission mechanism into meshing engagement with the accumulator drive gears, simultaneously moving the blocking bail 568 or 570 into blocking engagement with the associated tens-transfer latch abutments 474 or 503, as described above.

Immediately after the selected gear transmission mechanism is moved into meshing engagement with the accumulator drive gears, the actuator bail will accomplish its downward stroke, moving those actuator sectors in the orders corresponding to the orders of the accumulator gears which have been moved away from their "0" position, downwardly until the corresponding accumulator gears are stopped by engagement of their tens-transfer cams with the locked transfer latch abutments 474 or 503, as described above.

The lobe portion 931 of the cam 178 extends through approximately 180 degrees of angular extent so that, when the actuator bail has completed its downward movement, the print wheels have been set and the printing operation has taken place. Just before the actuator bail starts its upward movement, the cam follower 941 rides up on the cam lobe 931 thereby moving the link 560 and the bellcrank levers 545 and 550 to release the transmission gear mechanisms. As the transmission latching means are also released at this time, the transmission mechanism which has been moved into engagement with the accumulator drive gears, will be moved out of engagement with these drive gears before the actuator bail starts its upward movement and the consequent upward movement of the actuator sectors will not re-enter into the accumulator the total which was read out of the accumulator on the downward stroke of the actuator bail and sectors.

The total printing cycle will thus leave both the print wheels and the accumulator gears in their zero setting and will completely clear the machine.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculator, ordinally arranged accumulator wheels, add pinion trains for additively and subtract pinion trains for subtractively operating said accumulator wheels, a highest order controlled means for inserting a positive "fugitive 1" in the lowest order accumulator wheel, a highest order controlled means for inserting a negative "fugitive 1" in the lowest order accumulator wheel, positive and negative tens-transfer means set by such accumulator wheels as have been moved through ten unit spaces in either direction from their "0" position and actuated to move the accumulator gear in the order next above the transfer setting gear one unit space in the appropriate direction, and power means for simultaneously resetting all said tens-transfer means.

2. In a calculator having ordinally arranged accumulator wheels and means for differentially rotating said wheels the combination which comprises a transfer cam mounted on each wheel, a positive tens-transfer member for each wheel other than the highest order wheel operated by the cam on the corresponding wheel when rotating in one direction to effect a positive tens-transfer into the next higher order wheel, a negative tens-transfer member for each wheel other than the highest order wheel operated by the cam on the corresponding wheel when rotating in the other direction to effect a negative tens-transfer into the next higher order, a positive "fugititve 1" member for the highest order wheel operated by the cam on the highest order wheel when rotating in said one direction to effect a positive transfer of "1" into the lowest order of the accumulator, and a negative "fugitive 1" member for the highest order wheel operated by the cam on said highest order wheel when rotating in said other direction to effect a negative transfer of "1" into the lowest order of the accumulator, whereby one of said tens-transfer members in each order initiates a positive tens-carry and the other tens-transfer member in the same order a negative tens-carry from each order to its next higher order and from the highest order to the lowest order to form a closed chain of said ordinal tens-transfer means.

3. In a calculator having ordinally arranged accumulator wheels and means for differentially rotating said wheels the combination which comprises a transfer cam mounted on each wheel, a positive tens-transfer member for each wheel other than the highest order wheel operated by said cam when rotating in one direction to effect a positive tens-transfer into the next higher order wheel, a negative tens-transfer member for each wheel other than the highest order wheel operated by said cam when rotating in the other direction to effect a negative tens-transfer into the next higher order, a positive "fugitive 1" member for the highest order wheel operated by the cam on this wheel when the wheel is rotating in said one direction and connected to the positive tens-transfer member of the lowest order wheel to effect a positive transfer of "1" into the lowest order of the accumulator, a negative "fugitive1" member for the highest order wheel operated by the cam on this wheel when the wheel is rotating in said other direction and connected to the negative tens-transfer member of the lowest order wheel to effect a negative transfer of "1" into the lowest order of the accumulator, whereby one of said members initiates a positive tens-carry and the other a negative tens-carry from each order to its next higher order and from the highest order to the lowest order to form a closed chain of said ordinal transfer means, a rockable gate adjacent said lowest order and having different positions corresponding to the positive or negative character of the sign of the value in the accumulator and being moved from one position to the other by the tens-transfer members of the lowest order accumulator wheel incident to the passage between said highest and lowest orders of a tens-carry of a sign other than the sign to which the position of the gate corresponds.

4. In an accumulator, a positive and a negative sensor for sensing the sign of said accumulator, spring means for biasing said sensors to a sensing position and a single sensor operator for controlling the operation of said sensors.

5. In an accumulator having denominational accumulator gears and positive and negative tens-transfer mechanisms, a sign indicator movable to either a positive or a negative position by the tens-transfer mechanism in accord with the sign of the value in said accumulator, a positive and a negative sensor of the position of said indicator, yieldable power means for biasing both of said sensors to an operative position, means controlled by the position of said sign indicator for blocking operation of one or the other of said sensors, and a single sensor operator for controlling the operation of said said sensors.

6. In an accumulator, a plurality of ordinally arranged accumulator wheels, a tens-carry cam on each wheel, positive and negative tens-carry mechanisms controlled by said cams, a positive block and a negative block cooperating with said cams to stop said gears at "0" position, a sign indicating gate having positions indicative of the algebraic sign of the value in said accumulator and moved from one position to the other by said tens-transfer mechanisms, a positive sensor and a negative sensor for sensing the positions of said gate, means for operating said sensors, and means operated by said negative sensor for moving said negative block to blocking position and by said positive sensor for moving said positive block to blocking position.

7. An adding machine accumulator having a plurality of ordinally arranged accumulator wheels, means for reading in and out of said wheels negative and positive values, a pawl for entering a positive tens-transfer in each of said wheels and another pawl for entering a negative tens-transfer in each of said wheels, whereby totals may be accumulated in such accumulator, a sensing member adapted to be swung between a position indicative of a positive total in said accumulator and a position indicative of a negative total therein by movement of the pawls associated with the accumulator wheel of a predetermined order, and means sensing the position of said sensing member for determinging the taking of positive or negative totals from such accumulator.

8. In an adding machine, an accumulator having ordinally arranged rotatable wheels, positive and negative tens-transfer mechanisms and positive and negative true credit balance device for making a tens-transfer from the highest order to the lowest order of said accumulator wheels whenever the highest order wheel moves through ten unit spaced from its "0" position to render said accumulator capable of storing true values of opposite sign, a gate having two different positions, each corresponding to and indicative of the sign of a value in said accumulator, and moved from one to the other position by said true credit balance devices, accumulator readout mechanism for rotating said wheels in either direction, and spring pressed feelers sensing the position of said gate and controlling said readout means to determine the direction of rotation of said wheels for readout thereof and the sign of such readout.

9. In a calculating machine, an accumulator having accumulator gears, a blocking gate and means moving said blocking gate to one or the other of two blocking positions in response to the character of the algebraic sign of the total value carried in the accumulator, a positive and a negative read out means selectively engageable with said accumulator gears under the control of said blocking gate for taking totals and subtotals from said accumulator, a power driven total cam, a power driven subtotal cam, a single link actuated by said total cam or said subtotal cam to place either said positive or said negative readout means in total or subtotal taking engagement with said accumulator gears, and manually operated means selectively enabling either said total cam or said subtotal cam to actuate said link.

10. In a calculating machine, an accumulator having accumulator gears, a blocking gate and means moving said blocking gate to one or the other of two blocking positions in response to the character of the algebraic sign of the total value carried in the accumulator, a positive and a negative readout means selectively engageable with said accumulator gears under the control of said blocking gate for taking totals and subtotals from said accumulator, a power driven total cam, a power driven subtotal cam, a single link, actuated by said total cam or said subtotal cam to place either said positive or said negative readout means in total or subtotal taking engagement with said accumulator gears, manually operated means selectively enabling either said total cam or said subtotal cam to actuate said link, and power operated means imparting successive cyclic rotations to said cams under manual control, said subtotal cam having a lobe portion of limited angular extent effective to move the selected read out means out of engagement with said accumulator gears only near the end of the corresponding cyclic rotation of said cams and said total cam having a lobe portion of sufficient angular extent to maintain the selected read out means out of engagement with said accumulator gears during the latter half of the corresponding cyclic rotation of said cams.

11. In a calculator, a short rise cam for subtotal taking, a long rise cam for total taking, a single link operative in both totalling and subtotalling, a total cam follower directly connected to and operative of said link, a subtotal cam follower, and selective means for operating said link by said subtotal cam follower.

12. An adding machine having an accumulator capable of storing values of either positive or negative sign, a member having two different positions and moved by said accumulator from one position to the other in response to a change of the sign of a value in said accumulator, a first read out mechanism connectable to said accumulator for reading out positive values, a second read out mechanism connectable to said accumulator for reading out negative values, and spring-pressed feelers for sensing the position of said member and operable to select the appropriate read out mechanism for connection to said accumulator.

13. In a calculating machine having a ten-key keyboard, a selector mechanism operated by said keyboard and including ordinally arranged selector members differentially settable order by order to a selected entry value, a cyclically operative power operated means including a unidirectionally rotatable main shaft, a printing mechanism, an accumulator, an actuator mechanism driven by said main shaft and including ordinally arranged actuator elements, a positive transmission mechanism permanently connected between said actuator mechanism and said printing mechanism and engageable with said selector mechanism and said accumulator, a negative transmission mechanism engageable with said actuator mechanism and said accumulator, an addition control key effective to establish an operative cycle of said main shaft, means driven by said main shaft and conditioned by said addition control key to move said positive transmission mechanism into engagement with said selector mechanism during the first portion of the operating cycle established by said addition control key and into engagement with said accumulator during the last portion of the same operating cycle, a subtraction control key effective when operated to establish an operating cycle of said main shaft, means driven by said main shaft and conditioned by operation of said subtraction control key to move said positive transmission mechanism into engagement with said selector mechanism during the first portion of the operating cycle established by said subtraction control key and to move said positive transmission mechanism to a neutral position and move said negative transmission mechanism into position to connect said actuator mechanism to said accumulator during the latter portion of the same operating cycle, a total control key effective when operated to establish an operating cycle of said main shaft, and means conditioned by operation of said total control key and actuated by said main shaft at the beginning of the cycle established by said total control key to alternatively move said positive transmission mechanism or said negative transmission mechanism into engagement with said accumulator, in accordance with the positive or negative character of the value standing in the said accumulator, said means being effective to hold said transmission mechanisms in neutral position during the latter portion of the same operating cycle to leave said accumulator in a cleared condition at the end of said cycle.

14. In a calculating machine having selection mechanism including ordinally arranged selection elements differentially settable to entry value positions, register mechanism spaced from said selection mechanism, accumulator mechanism spaced from said selection mechanism and said register mechanism, a single actuator, power means drivingly connectable to said actuator to impart cycles of operation thereto, transmission mechanism drivenly connected to said actuator and having a first position in which it is clear of said selection mechanism and said accumulator, a second position in which it interconnects said selection mechanism, said register mechanism and said actuator, and a third position in which it interconnects said register mechanism, said actuator and said accumulator mechanism, and power actuated means for moving said transmission mechanism from one position to another under manual control, manually operated control means effective to establish an operating cycle of said actuator and control said power actuated means to place said transmission mechanism in said third position during the former portion of the coincident operating cycle to enter the accumulated value from said accumulator mechanism into said register mechanism, and means resiliently urging said transmission mechanism to said first position.

15. In a calculating machine, a ten-key keyboard, selection mechanism shiftable to and from a right-hand full-cycle position and including ordinally arranged selection elements differentially settable to different angular positions by said keyboard, printing mechanism spaced from said selection mechanism and including ordinally arranged printing members, accumulator mechanism spaced from said selection mechanism and said printing mechanism and including ordinally arranged accumulator gears, single actuating mechanism including ordinally arranged actuator sectors rockable between a full-cycle position and differentially set positions, power means drivingly connectable to said actuator mechanism to drive said mechanism through separate operating cycles, transmission mechanism drivenly connected to said actuator mechanism and including ordinally arranged transmission gear trains, said transmission mechanism being drivingly connected to said printing mechanism and having a first position in which it is clear of said selection mechanism and said accumulator mechanism, a second position in which it is drivingly connected with said selection mechanism and a third position in which it is drivingly connected with said accumulator mechanism, means resiliently urging said transmission mechanism to said first position, power actuated means effective to move said transmission mechanism from said first position to said second and said third positions, first manually operated control means effective to establish an operating cycle of said actuator mechanism and control said power actuated means to engage said transmission mechanism during an early portion of the coincident operating cycle with those selection elements which have been stepped to the left from their full-cycle position and differentially set, to return said selection elements to their "0" positions and correspondingly displace the associated actuator sectors and printing members, and to engage said transmission mechanism with said accumulator mechanism during a later portion of the same operating cycle to correspondingly displace the associated accumulator gears as the printing members and actuator sectors are returned to their full-cycle positions, and second manually operated control means effective to establish an operating cycle of said actuator mechanism and control said power actuated means to engage said transmission mechanism with said accumulator mechanism during an early portion of the coincident operating cycle and while said selection mechanism is in its full-cycle position to turn the accumulator gears to their "0" positions and correspondingly displace the associated printing members.

16. In a calculator, an actuator having differentially settable sectors, an accumulator having bidirectionally rotatable gears, a positive pendent train and a negative pendent pinion train each selectively placeable for connecting said actuator sectors and said accumulator gears, a tens-carry cam secured to each accumulator gear, a positive zero block and a negative zero block for said tens-carry cams, a gate having different positions corresponding to the positive or negative character of the sign of the value in said accumulator, positive and negative tens-carry devices enabled by said tens-carry cams and effective to move said gate from one position to the other upon a change in the algebraic sign of a value in said accumulator, a positive sensing element disabled by said gate when the sign of the value in said accumulator is negative, a negative sensing element disabled by said gate when the sign of the value in said accumulator is positive, manually controlled means enabling said sensing elements, means operated by said positive sensing element for placing said positive zero block in blocking position and for placing said positive pinion train to connect said actuator sectors and said accumulator gears when the sign of the value in said accumulator is positive, and means operated by said negative sensing element for placing said negative zero block in blocking position and for placing said negative pinion train to connect said actuator sectors and said accumulator gears when the sign of the value in said accumulator is negative.

17. In a calculating machine, an accumulator having bidirectionally rotatable gears and a positive tens-carry mechanism and a negative tens-carry mechanism, a positive readout means effective to read out a value in said accumulator in one direction of accumulator gear rotation, a negative readout means effective to read out a value in said accumulator in the opposite direction of accumulator gear rotation, a sign sensing gate mounted adjacent said accumulator and moved by said tens-carry mechanisms to occupy one predetermined position when the sign of the value in said accumulator is positive and a different predetermined position when the sign of the value in said accumulator is negative, normally disabled spring actuated means controlled by the position of said sign sensing gate to select the appropriate readout means for reading a value out of said accumulator, means effective to enable said spring actuated means including a link connected to said spring actuated means and a total cam and a subtotal cam alternatively effective to control the enabling of said spring actuated means by said link during predetermined portions of a readout cycle of the machine, and manual means effective to selectively condition said cams to enable said spring actuated means.

18. In a calculating machine, selection mechanism including ordinally arranged and differentially settable selection elements, keyboard mechanism effective to differentially set said selection elements, printing mechanism, accumulator mechanism, actuator mechanism permanently connected to said printing mechanism and sequentially connectable to said selection elements and said accumulator mechanism to read a value out of said selection mechanism into said printing mechanism and said actuator mechanism and out of said actuator mechanism into said accumulator mechanism while zeroizing said printing mechanism, cyclically operating power means effective to impart operating cycles to said actuator mechanism, manually operable control means effective to establish an operating cycle of said power means, and interponent means conditioned by operation of said control means and actuated by said power means to first connect said actuator mechanism to said accumulator mechanism instead of said selection mechanism to read out said actuator mechanism to zero and transmit any value standing in said accumulator to said printing mechanism, and to then disconnect said actuator mechanism from said accumulator mechanism while said actuator mechanism returns said printing mechanism to "0."

19. In a calculating machine, selection mechanism including ordinally arranged and differentially settable selection elements, accumulator mechanism, record making mechanism, actuator mechanism for transferring values from said selection mechanism to said record making mechanism and said accumulator mechanism and from said accumulator mechanism to said record making mechanism, cyclically operating power means effective to impart operating cycles to said actuating mechanism, manually operable control keys each effective when operated to establish an operating cycle of said power means to drive said actuating mechanism in one direction during the first portion of an operating cycle and in the opposite direction during the latter portion of the same operating cycle, mechanism conditioned by operation of one of said control keys and actuated by said power means to connect said actuator mechanism with said selection mechanism during the first portion of an operating cycle and with said accumulator mechanism during the latter portion of the same operating cycle, and other mechanism controlled by operation of another one of said control keys and operated by said power means to connect said actuator mechanism with said accumulator mechanism during the first portion of an operating cycle and to disconnect said actuator mechanism from said accumulator mechanism after said first portion and before the end of said operating cycle.

References Cited in the file of this patent

UNITED STATES PATENTS

| | | |
|---|---|---|
| 1,853,791 | Wheelbarger | Apr. 12, 1932 |
| 2,110,987 | Kammel | Mar. 15, 1938 |
| 2,221,861 | Butler | Nov. 19, 1940 |
| 2,459,441 | Lippert | Jan. 18, 1949 |
| 2,503,800 | Christian | Apr. 11, 1950 |
| 2,648,497 | Boyden | Aug. 11, 1953 |
| 2,665,844 | Westinger et al. | Jan. 12, 1954 |
| 2,677,499 | Boyden et al. | May 4, 1954 |

UNITED STATES PATENT OFFICE
Certificate of Correction

Patent No. 2,832,533　　　　　　　　　　　　　　　　　　　　　April 29, 1958

Harold J. Chall

It is hereby certified that error appears in the printed specification of the above numbered patent requiring correction and that the said Letters Patent should read as corrected below.

Column 2, line 59, for "leaterally" read —laterally—; column 5, line 7, for "pluarlity" read —plurality—; line 29, for "provement" read —provided—; line 35, for "seelctor" read —selector—; line 46, for "elements" read —element—; column 21, line 44, for "connect" read —connected—; column 25, line 1, for "determinging" read —determining—; line 9, for "spaced" read —spaces—; line 44, after "link" strike out the comma; column 26, line 10, before "an", second occurrence, insert —and—; lines 52 and 55, 61, 63 and 72, for "register", each occurrence, read —printing—; same line 55, for "a single actuator" read —actuator means, and—; lines 56, 58, 62 and 63, after "actuator", each occurrence, insert —means—; column 27, line 51, after "pendent" insert —pinion—.

Signed and sealed this 30th day of June 1959.

[SEAL]

Attest:
KARL H. AXLINE,
*Attesting Officer.*

ROBERT C. WATSON,
*Commissioner of Patents.*